United States Patent
Andersen et al.

(10) Patent No.: US 11,589,964 B2
(45) Date of Patent: Feb. 28, 2023

(54) PROCESS FOR 3D PRINTING

(71) Applicant: Ossiform ApS, Odense C (DK)

(72) Inventors: Morten Østergaard Andersen, Odense S (DK); Martin Bonde Jensen, Odense C (DK); Casper Slots, Odense C (DK)

(73) Assignee: Ossiform ApS, Odense C (DK)

( * ) Notice: Subject to any disclaimer, the term of this patent is extended or adjusted under 35 U.S.C. 154(b) by 30 days.

(21) Appl. No.: 17/009,657

(22) Filed: Sep. 1, 2020

(65) Prior Publication Data

US 2020/0397542 A1 Dec. 24, 2020

Related U.S. Application Data

(63) Continuation of application No. 15/766,965, filed as application No. PCT/DK2016/050323 on Oct. 7, 2016, now Pat. No. 10,800,934.

(30) Foreign Application Priority Data

Oct. 9, 2015 (DK) ............................ PA 2015 70645

(51) Int. Cl.
*B33Y 80/00* (2015.01)
*A61C 13/00* (2006.01)
(Continued)

(52) U.S. Cl.
CPC .......... *A61C 13/0013* (2013.01); *A61C 13/00* (2013.01); *B22F 1/107* (2022.01); *B22F 10/20* (2021.01); *B28B 1/001* (2013.01); *B29C 64/112* (2017.08); *B29C 64/118* (2017.08); *B29C 64/124* (2017.08); *B29C 64/165* (2017.08); *B29C 64/188* (2017.08); *B33Y 40/20* (2020.01); *B33Y 70/10* (2020.01); *C04B 28/006* (2013.01); *C04B 28/04* (2013.01); *C04B 28/34* (2013.01); *C04B 33/04* (2013.01); *C04B 35/01* (2013.01); *C04B 35/08* (2013.01); *C04B 35/111* (2013.01); *C04B 35/14* (2013.01); *C04B 35/16* (2013.01); *C04B 35/447* (2013.01); *C04B 35/453* (2013.01); *C04B 35/457* (2013.01); *C04B 35/46* (2013.01); *C04B 35/4682* (2013.01); *C04B 35/486* (2013.01); *C04B 35/49* (2013.01); *C04B 35/495* (2013.01); *C04B 35/50* (2013.01); *C04B 35/505* (2013.01); *C04B 35/5152* (2013.01); *C04B 35/553* (2013.01); *C04B 35/563* (2013.01); *C04B 35/565* (2013.01); *C04B 35/5626* (2013.01); *C04B 35/583* (2013.01); *C04B 35/5805* (2013.01); *C04B 35/58007* (2013.01); *C04B 35/58014* (2013.01); *C04B 35/58028* (2013.01); *C04B 35/58085* (2013.01); *C04B 35/58092* (2013.01); *C04B 35/632* (2013.01); *C04B 35/634* (2013.01); *C04B 35/636* (2013.01); *C09D 11/033* (2013.01); *C09D 11/037* (2013.01); *C09D 11/32* (2013.01); *C09D 11/36* (2013.01); *C09D 11/38* (2013.01); *C09D 11/52* (2013.01); *B22F 10/10* (2021.01); *B22F 10/12* (2021.01); *B22F 10/14* (2021.01); *B22F 10/16* (2021.01); *B22F 10/18* (2021.01); *B22F 10/28* (2021.01); *B22F 10/60* (2021.01); *B22F 10/64* (2021.01); *B29C 64/106* (2017.08); *B29C 64/153* (2017.08); *B29K 2105/0064* (2013.01); *B29L 2031/753* (2013.01); *B29L 2031/7532* (2013.01); *B29L 2031/7534* (2013.01); *B29L 2031/7536* (2013.01); *B33Y 10/00* (2014.12); *C04B 2111/00129* (2013.01); *C04B 2111/00181* (2013.01);
(Continued)

(58) Field of Classification Search
CPC .......... B22F 10/10; B22F 10/12; B22F 10/14; B22F 10/16; B22F 10/18; B22F 10/28; B22F 10/60; B22F 10/64; B29C 64/10; B29C 64/106; B29C 64/112; B29C 64/118; B29C 64/124; B29C 64/153; B29C 64/165; B29C 64/188; B29K 2105/0064; B29L 2031/753; B29L 2031/7532; B29L 2031/7534; B33Y 10/00
USPC ............ 264/113, 308, 401, 497; 219/121.66, 219/121.85; 419/23, 26, 27, 29, 30
See application file for complete search history.

(56) References Cited

U.S. PATENT DOCUMENTS 5,738,817 A * 4/1998 Danforth ............... B29C 64/165
264/308 X
5,997,795 A 12/1999 Danforth et al.
(Continued)

FOREIGN PATENT DOCUMENTS

CN 102430151 A 5/2012
CN 103801695 A 5/2014
(Continued)

OTHER PUBLICATIONS

Japanese Office Action; Japanese Patent Office; Japanese Patent Application No. 2018-518446; dated Sep. 29, 2020 15 pages.
(Continued)

*Primary Examiner* — Leo B Tentoni
(74) *Attorney, Agent, or Firm* — Taft Stettinius & Hollister LLP

(57) ABSTRACT

The present invention relates to a suspension comprising 50-95% by weight of the total suspension (w/w) of at least one metallic material and/or ceramic material and/or polymeric material and/or solid carbon containing material; and at least 5% by weight of the total suspension of one or more fatty acids or derivatives thereof. In addition, the invention relates to uses of such suspension in 3D printing processes.

20 Claims, 17 Drawing Sheets

(51) Int. Cl.

| | |
|---|---|
| *C04B 35/563* | (2006.01) |
| *C04B 28/00* | (2006.01) |
| *C04B 35/468* | (2006.01) |
| *C04B 35/583* | (2006.01) |
| *C04B 35/01* | (2006.01) |
| *C04B 28/04* | (2006.01) |
| *C04B 35/505* | (2006.01) |
| *C04B 35/632* | (2006.01) |
| *C04B 35/495* | (2006.01) |
| *C04B 35/16* | (2006.01) |
| *C04B 35/58* | (2006.01) |
| *C04B 35/50* | (2006.01) |
| *C04B 35/457* | (2006.01) |
| *C04B 28/34* | (2006.01) |
| *C04B 35/56* | (2006.01) |
| *C04B 35/111* | (2006.01) |
| *C04B 35/515* | (2006.01) |
| *C04B 35/486* | (2006.01) |
| *C04B 35/636* | (2006.01) |
| *C04B 33/04* | (2006.01) |
| *C04B 35/447* | (2006.01) |
| *C04B 35/565* | (2006.01) |
| *C04B 35/453* | (2006.01) |
| *C04B 35/46* | (2006.01) |
| *C04B 35/49* | (2006.01) |
| *C04B 35/634* | (2006.01) |
| *C04B 35/08* | (2006.01) |
| *C04B 35/14* | (2006.01) |
| *C04B 35/553* | (2006.01) |
| *B29C 64/165* | (2017.01) |
| *B29C 64/188* | (2017.01) |
| *B29C 64/112* | (2017.01) |
| *B29C 64/124* | (2017.01) |
| *B29C 64/118* | (2017.01) |
| *B22F 10/20* | (2021.01) |
| *B22F 1/107* | (2022.01) |
| *B33Y 70/10* | (2020.01) |
| *B33Y 40/20* | (2020.01) |
| *B28B 1/00* | (2006.01) |
| *C09D 11/033* | (2014.01) |
| *C09D 11/037* | (2014.01) |
| *C09D 11/32* | (2014.01) |
| *C09D 11/36* | (2014.01) |
| *C09D 11/38* | (2014.01) |
| *C09D 11/52* | (2014.01) |
| *C04B 111/00* | (2006.01) |
| *B29C 64/153* | (2017.01) |
| *B29L 31/00* | (2006.01) |
| *B29C 64/106* | (2017.01) |
| *B22F 10/18* | (2021.01) |
| *B22F 10/64* | (2021.01) |
| *B22F 10/60* | (2021.01) |
| *B29K 105/00* | (2006.01) |
| *B22F 10/10* | (2021.01) |
| *B22F 10/16* | (2021.01) |
| *B22F 10/12* | (2021.01) |
| *B22F 10/14* | (2021.01) |
| *B22F 10/28* | (2021.01) |
| *B33Y 10/00* | (2015.01) |

(52) U.S. Cl.
CPC ............... *C04B 2235/6021* (2013.01); *C04B 2235/6026* (2013.01); *C04B 2235/658* (2013.01); *C04B 2235/95* (2013.01); *Y02P 10/25* (2015.11); *Y02P 40/10* (2015.11)

(56) References Cited

U.S. PATENT DOCUMENTS

| | | |
|---|---|---|
| 2002/0090398 A1* | 7/2002 | Dunn ............... A61K 47/34 424/486 |
| 2009/0321971 A1 | 12/2009 | Brodkin et al. |
| 2010/0040767 A1 | 2/2010 | Uibel et al. |
| 2011/0215507 A1 | 9/2011 | Apel et al. |
| 2012/0178042 A1 | 7/2012 | Brodkin et al. |
| 2012/0308837 A1 | 12/2012 | Schlechtriemen et al. |
| 2014/0353878 A1 | 12/2014 | Driessen et al. |
| 2015/0069649 A1 | 3/2015 | Bai et al. |
| 2015/0202265 A1 | 7/2015 | Tölli et al. |
| 2017/0253751 A1* | 9/2017 | Busbee ............ B29C 64/112 |

FOREIGN PATENT DOCUMENTS

| | | |
|---|---|---|
| CN | 103801697 A | 5/2014 |
| CN | 103819656 A | 5/2014 |
| CN | 103923470 A | 7/2014 |
| CN | 104057090 A | 9/2014 |
| CN | 104149337 A | 11/2014 |
| CN | 104327470 A | 2/2015 |
| CN | 104710548 A | 6/2015 |
| CN | 104725046 A | 6/2015 |
| EP | 0739868 A1 | 10/1996 |
| JP | 2001-513481 A | 9/2001 |
| JP | 2015-112751 A | 6/2015 |
| WO | 0073241 A1 | 12/2000 |

OTHER PUBLICATIONS

Partial European Search Report; European Patent Office; European Patent Application No. 20171517.4; dated Jul. 10, 2020; 16 pages.
Database WPI; Week 201532; Thomson Scientific; London, GB; AN 2015-20268E; XP002799577; 2 pages.
International Search Report; European Patent Office; International Application No. PCT/DK2016/050323; dated Apr. 20, 2017; 8 pages.
Written Opinion of the International Searching Authority; European Patent Office; International Application No. PCT/DK2016/050323; dated Apr. 20, 2017; 13 pages.
International Preliminary Report on Patentability; The International Bureau of WIPO; International Application No. PCT/DK2016/050323; dated Apr. 10, 2018; 14 pages.
Chinese Office Action, National Intellectual Property Administration, People's Republic of China, Chinese Application No. 201680058981.2, dated Nov. 4, 2019, 18 pages.
Australian Second Examination Report; IP Australia; Australian Patent Application No. 2016334413; dated Jul. 28, 2022; 4 pages.

\* cited by examiner

Non-Sintered HEC-H₂O-βTCP

Sintered HEC-H₂O-βTCP

Sintered HEC-H₂O-βTCP with 1x PCL Coat

Sintered HEC-H₂O-βTCP with 2x PCL Coat

Sintered Oleic Acid-βTCP

Sintered Oleic Acid-βTCP with 1x PCL Coat

HEC-H₂O-βTCP with hMSCs after 15 days in MM

HEC-H₂O-βTCP-1xPCL with hMSCs after 15 days in MM

OA-βTCP with hMSCs after 15 days in MM

OA-βTCP-1xPCL with hMSCs after 15 days in MM

A

B

Maintenance Medium, Day 1

Maintenance Medium, Day 2

Maintenance Medium, Day 2+7

Osteogenic Medium, Day 2+7

PROCESS FOR 3D PRINTING

CROSS-REFERENCE TO RELATED APPLICATIONS

The present application is a continuation of U.S. patent application Ser. No. 15/766,965 filed Apr. 9, 2018 which issued as U.S. Pat. No. 10,800,934 on Oct. 13, 2020, which is a U.S. national stage filing of International Application No. PCT/DK2016/050323 filed Oct. 7, 2016, which claims priority to Danish Patent Application No. PA 2015 70645 filed Oct. 9, 2015, each of which are incorporated herein by reference in their entirety.

TECHNICAL FIELD OF THE INVENTION

The present invention relates to a feedstock for 3D printers and extruders. In particular, the present invention relates to uses of the feedstock in 3D printing and extrusion processes.

BACKGROUND OF THE INVENTION

Additive manufacturing, popularly known as 3D printing or freeform fabrication, has become a widespread technology in many industrial sectors for the preparation of product prototypes and physical representations of virtual designs. The technology also has the potential for revolutionizing production as it allows for decentralized and rapid production of custom products. This is due to the low investment cost and space requirement for the necessary equipment, materials and tooling compared to traditional manufacturing methods like casting, molding and machining. However, the limited number of materials that most 3D printers are able to print in severely limit the potential for producing a final product using 3D printing. Most common 3D printers, such as those that rely on melt deposition of filament, stereolithography or ink jetting, are only able to print a limited number of polymeric materials. Certain 3D printers, such as those that solidify powder using a laser or electrons, are able to print metal and ceramic materials in addition to polymers. But commonly, these printers are expensive, they can only print one material at a time and they rely on potentially dangerous power sources and vulnerable components like mirrors and lenses. Thus, there is a need for other additive manufacturing methods that can print in a wide range of materials, combine more than one material in a print, and use inexpensive, safe and simple machinery.

Robocasting, also known as direct ink writing, is a different additive manufacturing technique originating in the late 1990'ies. It relies on extruding an ink through a nozzle onto a stage. The nozzle, the stage or both, then move in the X, Y and Z directions following programmable g-code instructions allowing the extrusion of ink only in specific places. By depositing layers on layers a 3D object is built up. The final object may then be post-processed by sintering, which burns/evaporates remaining liquid and organic content and merges the individual particles. Other post-processing methods may also be used.

Various inks exist but inks that are particle suspensions or slurries are particularly interesting as one can achieve a high solid loading with such inks. When particle inks are deposited and the solvent removed through e.g. evaporation or burning only the solid content remains with voids where the liquid content was leading to porosity in and/or shrinkage of the final object. Porosity weakens certain physical properties of the final object like the mechanical strength and is thus undesired in many applications.

Unfortunately, a higher solid loading results in the suspension having higher viscosity as more particles contact each other with increased friction as a result. When pressure is applied to a particle suspension, any non-bound liquid is pressed out first leaving the solid particles behind.

Other inks rely on volatile organic compounds (VOCs) that evaporate after depositing the gel, many of such VOCs are now considered to be detrimental to human health.

Other inks are water based. Water may react with the particles, catalyse reactions with the colloids or dissolve substances or gasses that may react with the particles.

Other inks comprise compounds that are non-biocompatible. Objects made from such inks must be treated e.g. by debinding/sintering before they may be used medically.

A common post-printing treatment is sintering during which the organic contents of the ink burn away leaving only the particle content. Sintering most metals and some ceramics in reactive air chemically alters them and may result in an undesired material, oxygen in atmospheric air may for example oxidize metals to the metallic oxide. Sintering such materials usually requires a complex and expensive sintering oven, capable of applying protective and/or reducing gasses or vacuum in the chamber.

In addition, for some applications where sintering exhausts are not well controlled, the development of toxic gasses containing organic heteroatoms like nitrogen, sulphur and phosphor may be problematic.

Thus, there is a need in the art for improved feedstocks/inks in 3D printing processes.

SUMMARY OF THE INVENTION

The present inventors have identified a feedstock/ink for 3D printing processes. The feedstock according to the present invention may have several advantages:

Lower extrusion pressure and/or smaller nozzle cross section may be required for the 3D printing equipment;

Improved lubrication of the particle content is possible, thereby lowering the inter-particle friction, reducing the suspension's viscosity and allowing the use of higher solid loading with lower extrusion pressures and smaller nozzles;

A better binding to the particles, thereby avoiding that the liquid is pressed out of the particle suspension when pressure is applied leaving dry and unprintable powder behind;

May be water-free. Water may present a problem, as it is a good medium for chemical reactions such as oxidation of metal particles and hydration and setting of ceramic particles;

May be free of volatile organic compounds (VOCs);

The ink may generate a protective and/or reducing gas during sintering, thereby avoiding expensive sintering equipment; and/or The liquid phase may contain only hydrogen, carbon and oxygen;

The liquid phase may be solid at room temperature, but liquid at elevated temperatures. This allows the suspension to be printed when heated and to solidify after deposition at e.g. room temperature.

The feedstock may contain only biocompatible compounds and/or compounds found normally in the human body. Many common inks rely on non-biocompatible compounds that have to be burnt away before the object may be used, our ink may be used unchanged for medical purposes with the liquid phase in place, still liquid or solidified.

In sum, the present invention relates to a suspension comprising 50-95% by weight of the total suspension (w/w) of at least one (suspended) metallic material and/or (suspended) ceramic material and/or (suspended) polymeric material and/or (suspended) carbon containing material; and at least 3% (preferably at least 5%) by weight of the total suspension of one or more fatty acids or derivatives thereof, preferably fatty acids with more than 8 carbons atoms. In addition, the invention relates to uses of such suspension in 3D printing processes.

Thus, an object of the present invention relates to the provision of an improved feedstock for 3D printing.

In particular, it is an object of the present invention to provide a feedstock for 3D printing that solves the above-mentioned problems of the prior art.

Thus, one aspect of the invention relates to a suspension comprising 50-95% by weight of the total suspension (w/w) of at least one (suspended) ceramic material; and/or (suspended) metallic material and/or (suspended) polymeric material and/or (suspended) carbon containing material; and at least 3% by weight of the total suspension of one or more fatty acids or derivatives thereof, preferably saturated fatty acids, preferably at least 4%, and even more preferably at least 5%.

Another aspect of the present invention relates to the use of a suspension according to the invention, in a 3D printing or extrusion process.

Yet another aspect of the present invention is to provide a process for 3D printing or extruding a 3-dimensional (3D) object, the process comprising a) providing a suspension according to the invention;
b) 3D printing or extruding the object using the suspension as a feedstock; and
c) optionally, solidifying the printed or extruded material, e.g. by a method selected from the group consisting of sintering, hydrating, coating, melting, infiltrating, freezing, crystallizing, precipitating and/or crosslinking the 3D printed or extruded material.

Still another aspect of the present invention is to provide a 3D printed or extruded 3-dimensional object obtained/obtainable by a process according to the invention.

Yet an aspect of the invention relates to a 3D printer loaded with suspension according to the present invention.

The invention further relates to different kits e.g. comprising the suspension as defined below.

Silver sintered; D) Graphite Stearic acid; E) Blackmiagic conductive filament; and F) Rubber.

Figure 16:
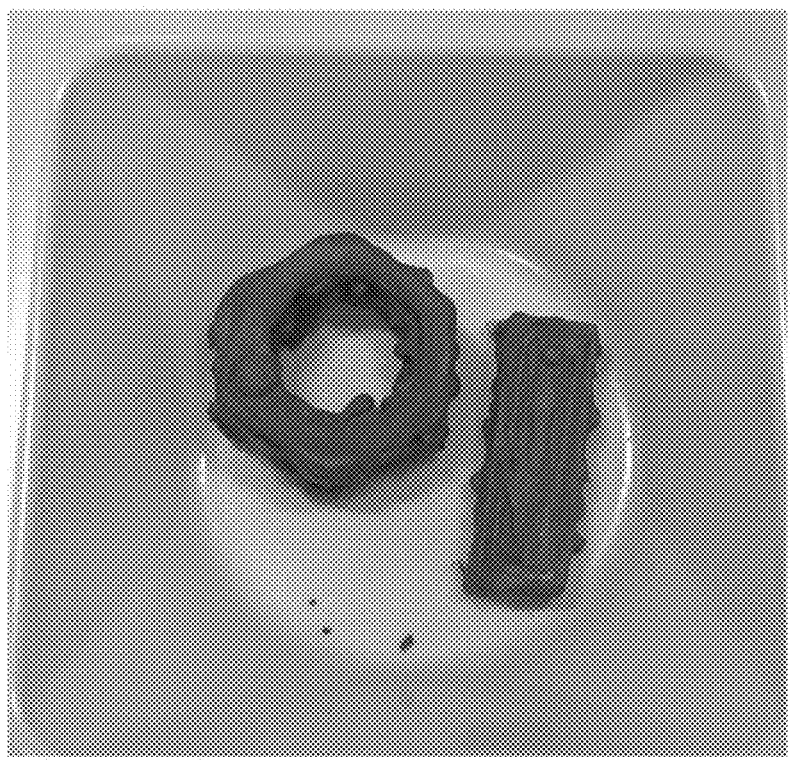
Figure 16:
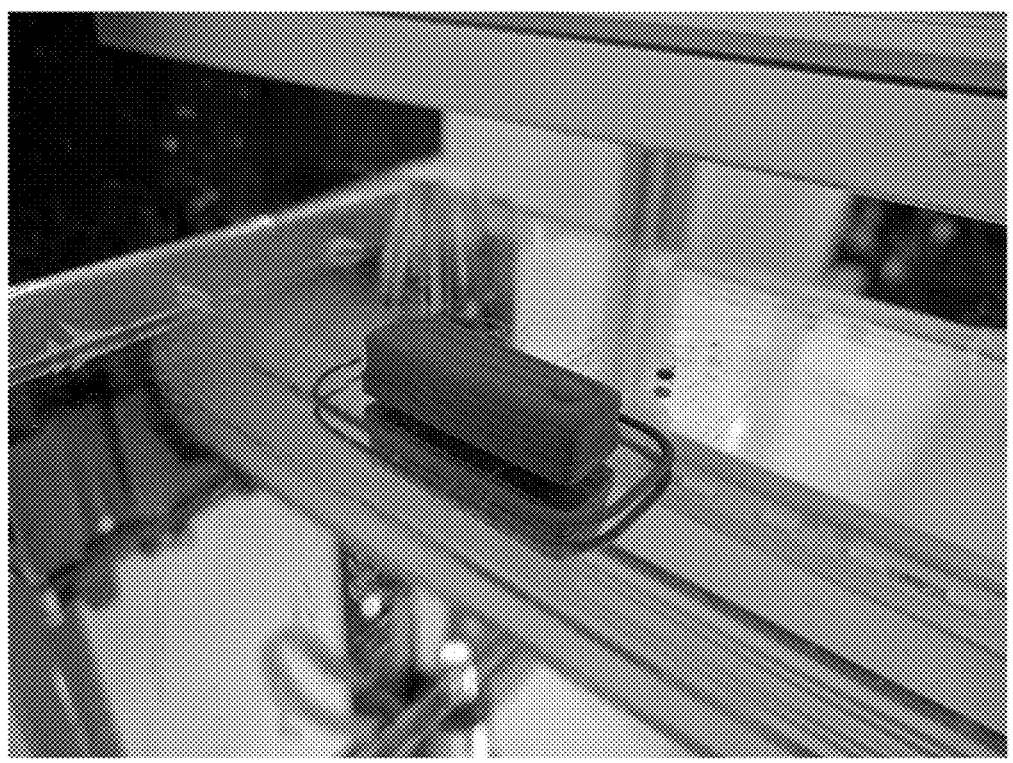

FIG. 16 shows 3D prints made with stearic acid/steel (Top) and stearic acid/copper (Bottom).

Figure 17:
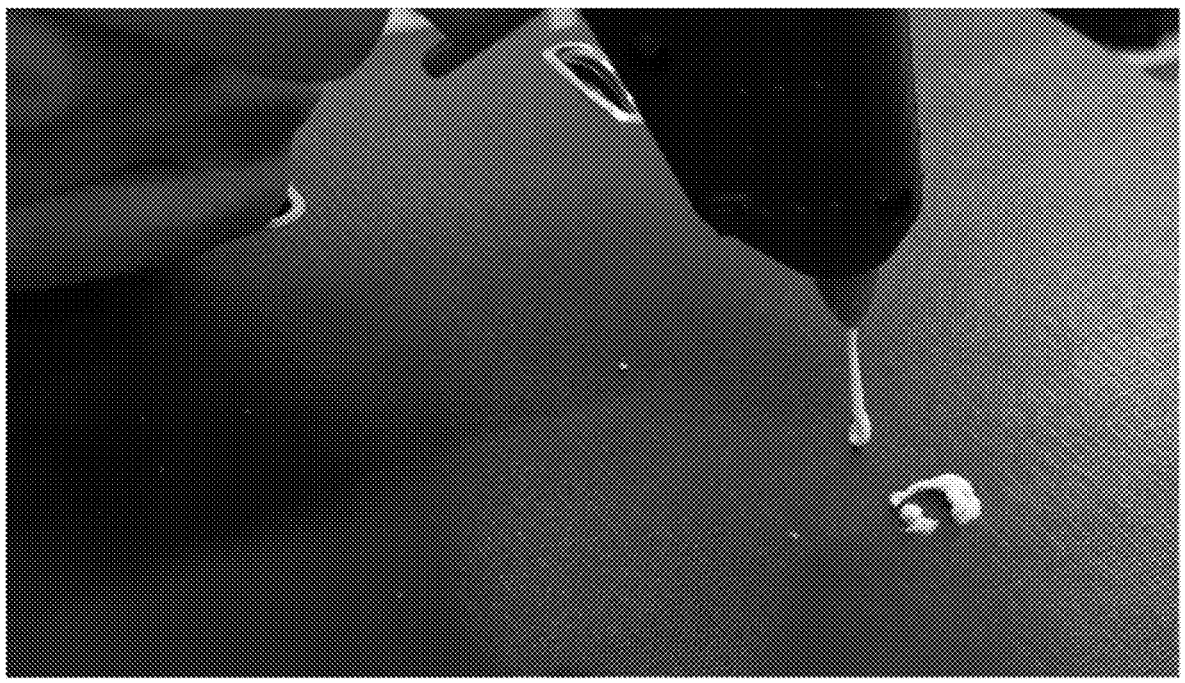

FIG. 17 shows deposition of stearic acid/TCP using a glue gun.

The present invention will now be described in more detail in the following.

DETAILED DESCRIPTION OF THE INVENTION

Suspension

As discussed above, the present invention relates in particular to a suspension having superior properties in 3D printing or extrusion processes. Thus, in an aspect the invention relates to a suspension comprising
- 50-95% by weight of the total suspension (w/w) of at least one metallic material and/or ceramic material and/or polymeric material and/or solid carbon containing material; and
- at least 3% by weight of the total suspension of one or more fatty acids or derivatives thereof, preferably saturated fatty acids, preferably at least 4%, and even more preferably at least 5%.

It is of course to be understood that the at least one metallic material and/or ceramic material and/or polymeric material and/or carbon containing material is suspended in the suspension. Thus, these materials are solids in the suspension.

As shown in e.g. example 1, other liquids are not able to support the same level of solids in a suspension during e.g. a 3D-printing process comprising ceramics. Example 3 shows the same effect of a composition comprising metal, exemplified by copper. Thus, in a more specific embodiment the suspension is for use as a feedstock for 3D printers or extruders. In the present context, the terms "feedstock" and "ink" may be used interchangeably. The terms relate to the material used in a 3D printing process, i.e. the material being printed.

Fatty Acids

In the present context, a fatty acid or derivative thereof is to be understood as one or more free carboxylic, sulfonic or phosphonic acid, attached to one or more hydrophobic hydrocarbon, which is either aliphatic or aromatic or possibly a mixture thereof. A large range of natural fatty acids exist, which are typically carboxylic acids attached to saturated or unsaturated alkyl groups, which may be unbranched (i.e. linear) or branched. Other synthetic or natural amphiphiles may also be used, which could include acids attached to for example aromatic and/or cyclic aliphatic groups.

In an embodiment of the invention, the term "fatty acid" acid includes free fatty acids. Free fatty acids are usually derived from triglycerides or phospholipids. When they are not attached to other molecules, they are known as "free" fatty acids.

In another embodiment, the one or more fatty acids or derivative thereof comprises at least one acid group from the group consisting of carboxylic acid, phosphonic acid and sulfonic acid group attached to at least one $C_5$-$C_{30}$ hydrocarbon.

In yet an embodiment, the hydrocarbon is a saturated or unsaturated aliphatic hydrocarbon group or an aromatic hydrocarbon group or a mixture thereof.

In a further embodiment, the fatty acid comprises at least one carboxylic acid and the hydrocarbon is a saturated or unsaturated $C_5$-$C_{30}$ aliphatic hydrocarbon group.

In yet an further embodiment, the fatty acid or derivative thereof is a compound of Formula (I):

wherein
R is a saturated or unsaturated $C_5$-$C_{30}$ aliphatic hydrocarbon group,
Z is selected from the group consisting of carbon (C), S(O), and P(OH).

In a preferred embodiment, Z is carbon (C). In another preferred embodiment the saturated or unsaturated $C_5$-$C_{30}$ aliphatic hydrocarbon group is unbranched.

In yet an embodiment, the saturated or unsaturated $C_5$-$C_{30}$ aliphatic hydrocarbon group is branched. In yet a further embodiment the saturated or unsaturated aliphatic hydrocarbon group is a $C_6$-$C_{30}$ aliphatic hydrocarbon group, such as a $C_7$-$C_{30}$, $C_8$-$C_{30}$, $C_9$-$C_{30}$, $C_{10}$-$C_{30}$, $C_{10}$-$C_{25}$, $C_{10}$-$C_{20}$ aliphatic hydrocarbon group.

Material

In an embodiment of the invention, the term "material" relates to a solid material or a powder of the material. It is of course to be understood that the material of the suspension is predominantly in a suspended form in the suspension. The material in the suspension is also in a form with a particle size to keep it predominantly in the suspension, such as by having a particle size in the range 1 nm-1 mm. The precise particle size may vary dependent on the material.

Metallic Material

When it comes to printing of metallic material, different metals may form part of the suspension. Thus, in an embodiment, the metallic material is selected from the group consisting of copper, zinc, aluminium, iron, silver, gold, palladium, platinum, tin, antimony, bismuth, lead, nickel, cobalt, vanadium, manganese, chromium, titanium, tantalum, tungsten, neodymium, lithium, sodium, osmium, iridium, uranium, thorium, plutonium, yttrium, zirconium, niobium, molybdenum, rhodium, cadmium, hafnium, rhenium, mercury, gallium, indium, thallium, lanthanum, cerium, praseodymium, promethium, samarium, europium, gadolinium, terbium, dysprosium, holmium, erbium, thulium, ytterbium, lutetium, potassium, calcium, magnesium, strontium, barium, germanium, arsenic, astatine and alloys and hydrides thereof. In example 3, copper is printed, in example 6 silver is printed and in example 7 copper and steel are printed.

Printing of Ceramic Material

In the present context, "ceramic materials" are inorganic, non-metallic materials made from compounds of a metal and a non-metal. When it comes to printing of ceramic material, different ceramics may form part of the suspension. Thus, in an embodiment, the ceramic material is selected from the group consisting of TCP (tricalciumphosphate), MCP (monocalciumphosphate), DCP (dicalciumphosphate), tetracalciumphosphate, hydroxylapatite, alpha-TCP, beta-TCP, titanium oxide (titania), aluminium oxide (alumina), zirconium oxide (zirconia), yttrium oxide (yttria), yttria stabilized zirconia, indium oxide, indium tin oxide, boron nitride, silicon carbide, boron carbide, tungsten carbide, beryllium oxide, zeolite, cerium oxide (ceria), tungsten disilicide, sodium silicide, platinium silicide, zirconium nitride, tungsten nitride, vanadium nitride, tantalum nitride, niobium nitride, silicon boride, clay, earth, soil, cement, portland cement, silica, barium titanate, lead zirconate titanium, zinc oxide, potassium niobate, lithium niobate, sodium tungstate, glass, geopolymers, sodium chloride, sodium nitrate, potassium nitrate, potassium chloride, magnesium chloride, calcium chloride, calcium nitrate, magnesium nitrate, strontium oxide, strontium phosphate, calcium sulfate, barium sulfate, calcium carbonate, sodium carbonate, sodium fluoride and mixtures thereof. In examples 1 and 2, different ceramics are printed in suspensions according to the invention.

Printing of Polymer Material

When it comes to printing of polymer material, different polymers may form part of the suspension. Thus, in an embodiment, the polymer material is selected from the group consisting of polylactic acid (PLA), polycaprolactone (PCL), polyglycolic acid (PGA), polystyrene (PS), polyethylene (PE), polypropylene (PP), polycarbonate (PC), poly(methyl methacrylate) (PMMA), poly(1,4-phenylene sulfide) (PPS), poly(2,6-dimethyl-1,4-phenylene oxide) (PPO), polyamide (PA), polybutylene terephthalate (PBT), polyetheretherketone (PEEK), polyetherketone (PEK), polyethylene terephthalate (PET), polyimide (PI), polyoxymethylene (POM), polysulfone (PSU), polyurethane (PU), polybutadiene (PB), polytetrafluoroethyelen (PTFE), polyvinylfluoride (PVF), polyvinylidene fluoride (PVDF), polychlorotrifluoroethylene (PCTFE), perfluoroalkoxy polymer (PFA), fluorinated ethylene-propylene (FEP), polyethylenetetrafluoroethylene (ETFE), polyethylenechlorotrifluoroethylene (ECTFE), polyethylene glycol (PEG), polyhydroxyalkanoates (PHA), polyhydroxyvalerate (PHV), polyhydroxybutyrate (PHB), liquid crystal polymer, polyacrylate, polyacetals, polyamideimide (PAI), polybutylene (PB), polyvinylchloride (PVC), acrylonitrile butadiene styrene (ABS), polyphenylsulfone (PPSU), polymethylpentane (PMP), alginate, chitin, chitosan, acrylic acid, hyaluronic acid, starch, amylose, amylopectin, pectin, dextran, pullulan, gum arabic, xanthan gum, pullulan, cellulose, elastin, collagen, gelatin, fibronectin, silk, polysaccharides, proteins, nucleic acids, rubber, silicone and co-polymers thereof.

Printing of Carbon Containing Material

When it comes to printing of carbon containing material, different molecules may form part of the suspension. Thus, in an embodiment, the carbon containing material is selected from the group consisting of: Graphite, graphene, carbon nanotubes, other allotropes of carbon, glucose, sucrose, citric acid, oxalic acid, penicillin, tetracycline, other antibiotics, analgesics, pain killers, vitamins, steroids, hormones, chemotherapy, other drugs and pharmaceutics, and mixtures thereof, as well as complex natural compositions such as bone matrix, dehydrated bone matrix and decellularized bone matrix derived from humans, animals, cell culture or any other living organism. Example 6 shows printing of graphite.

The particle size of the one or more materials may vary. Thus, in an embodiment, the particle size of the one or more materials are in the range 1 nm-1 mm, such as below 500 µm, below 354 µm, below 250 µm, below 149 µm, below 105 µm, below 74 µm, below 44 µm, below 10 µm, below 1 µm, below 500 nm, or below 100 nm, preferably below 10 µm. It is well known that the particle size may also be determined by the mesh size used to determine the upper limit of the particles. For example, a mesh 200 corresponds to a cut-off of 74 µm. In the example section materials which sizes from 0.5 micrometer up to around 44 micrometer have been tested.

Without being bound by theory it is believed that particles below 10 µm will work the best (thus a preferred embodiment). Alternatively a mixture of particles having particles in the range 1-10 micrometer and particles in the range 100 nm to 1 micrometer is preferred (another preferred embodiment). Such mixture of particles sizes gives in theory the best packinging and this may lead to a higher density of the printed material.

The amount of metallic and/or ceramic material may also be further defined. Thus, in an embodiment, the suspension comprises in the range 60-95% of the at least one metallic or ceramic material (or polymer), by weight of the total suspension (w/w), such as 60-95%, such as 70-95%, such as 77-95%, such as 80-95%, such as 85-95%, such as 90-95%, such as 80-85%, such as 80-84%, such as 80-83%, such as 80-82%, such as 81-85, such as 82-85%, or such as such as 83-85%. As shown in the example section, the optimal concentration can be determined for different materials.

Different fatty acids may form part of the present invention. Thus, in an embodiment, the one or more fatty acids are selected from the group consisting of caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, and docosahexaenoic acid. In the example section different fatty acids have been verified to comply with the present invention.

Similar, the concentration of fatty acid may also be optimized. Thus, in an embodiment, the suspension comprises in the range 5-50% fatty acid by weight of the total suspension, such as in the range 4-50%, such as in the range 5-50%, such as in the range 10-50%, such as in the range 10-40%, such as 10-30% such as 12-30%, such as 15-30%, such as 15-20%, such as 15-18% or such as 15-17%.

The combination of ceramic and fatty acid may also be optimized. Thus, in an embodiment, the suspension comprises a mixture of 80-85% (w/w) ceramic material and 15-20% (w/w) (free) fatty acid, such as a mixture of 80-85% (w/w) TCP and 15-20% (w/w) oleic acid; or a mixture of 80-85% (w/w) TCP and 15-20% (w/w) linoleic acid; or a mixture of 80-85% (w/w) TCP and 15-20% (w/w) steric acid.

In yet an embodiment, the suspension comprises a mixture of 70-90% (w/w) ceramic material and 10-30% (w/w) (free) fatty acid, such as a mixture of 70-90% (w/w) TCP and 10-30% (w/w) oleic acid; or a mixture of 70-90% (w/w) TCP and 10-30% (w/w) linoleic acid; or a mixture of 70-90% (w/w) TCP and 10-30% (w/w) steric acid. Examples of such compositions can be found in e.g. example 2.

In yet an embodiment the suspension comprises a mixture of 70-92% (w/w) metal material and 8-30% (w/w) (free) fatty acid, such as a mixture of 70-92% (w/w) copper and 8-30% (w/w) oleic acid; or a mixture of 70-92% (w/w)

copper and/or silver and 8-30% (w/w) linoleic acid; or a mixture of 70-92% (w/w) steel and 8-30% (w/w) steric acid. Examples of such compositions can be found in e.g. examples 3, 6 and 7.

In yet an embodiment the suspension comprises a mixture of 50-80% (w/w) carbon-containing material and 20-50% (w/w) (free) fatty acid, such as a mixture of 50-80% (w/w) graphite or graphene powder and 20-50% (w/w) (free) fatty acid; or a mixture of 50-80% (w/w) graphite and 20-50% (w/w) stearic acid. Examples of such compositions can be found in e.g. example 6.

Examples of preferred compositions which may find use in the processes and uses according to the present invention are listed below.

80-95% TCP with 20-5% of fatty acid that has a melting point above 37° C. Such composition may after printing (resulting material) find use as a bone or dental implant with or without prior sintering.

80-95% Hydroxyl apatite with 20-5% of fatty acid that has a melting point above 37° C. Such composition may after printing (resulting material) find use as a bone or dental implant with or without prior sintering.

80-95% biphasic TCP/hydroxylapatite with 20-5% of fatty acid that has a melting point above 37° C. Such composition may after printing (resulting material) find use as a bone or dental implant with or without prior sintering.

80-95% of a stoichiometric powder mixture of TCP and MCP with 20-5% of fatty acid that has a melting point above 37° C. Such composition may after printing (resulting material) find use as a bone or dental implant with or without prior sintering or cementing.

80-95% of a stoichiometric powder mixture of tetracalcium phosphate and dicalciumphosphate with 20-5% of fatty acid that has a melting point above 37° C. Such composition may after printing (resulting material) find use as a bone or dental implant with or without prior sintering or cementing.

In the above listed preferred embodiments one or more protein or carbohydrate extracellular matrix components or derivatives thereof, may be added to improve mechanical strength and/or cell adhesion and/or tissue formation. This could be collagen, gelatin, hyaluronic acid, elastin or fibronectin.

Further, in the above preferred embodiments one or more components, may be added to improve the binding between the calcium phosphate and the extracellular matrix component. This could be osteopontin, bone sialoprotein orbone acidic glycoprotein-75.

In an embodiment the material produced according to the invention, may be made from a suspension that dissolves in the human body and which leaves a hydrogel after dissolution and which is used as an implant for generating soft tissues such as cartilage, tendons, ligaments, vasculature, skin, adipose tissue or components of nervous tissue or of the internal organs. This could be a suspension comprising 5-30% fatty acid and 0.1%-95% of a solid particulate that may form a hydrogel, this could be an extracellular matrix component or derivative thereof e.g. collagen and gelatin. Such as suspension may also be added 1-94.9% of a carbon containing molecule to aid with dissolution, this could be carbohydrates, amino acids or other organic compounds that are solubilized in humans.

In yet an embodiment the 3D printed or extruded material is used as a non-sintered implant and an amphiphile component is added before, during or after 3D printing or extrusion to coat the material to make it more hydrophilic. This could for example be short or medium chain free fatty acids or aminoacids with hydrophobic sidechains.

In yet a further embodiment one or more drugs are added before or after 3D printing. This could for example be a natural protein such as a BMP, PDGF, HGF, IGF, NGF, BDNF, GDNF, VEGF, LIF or insulin, it could also be a plasmid DNA, viral DNA, viral RNA, small interfering RNA (siRNA), microRNA (miRNA), messenger RNA (mRNA), a CRISPR based nucleic acid editing system, a vitamin such as vitamin D, Vitamin C, Vitamin A, vitamin E or Vitamin K, a synthetic drug such as dexamethasone or H8, an anti-cancer drug such as doxorubicin, an anti-inflammatory and/or analgesic compound such as an NSAID drug or an antibiotic such as a penicillin, a tetracyclin, a quinolone, a macrolide, a cephalosporin, a carbapenem, an aminoglycoside or a glyco- or lipopeptide.

In yet an further embodiment the solid particulates are pharmaceuticals and the resulting material is used as an implantable drug depot with the aim of controlling drug release kinetics. In a similar embodiment the solid particulates are pharmaceuticals where they are mixed with excipients and/or carbohydrates and/or drug delivery systems and where the resulting material is used as an implantable drug depot with the aim of controlling drug release kinetics.

In yet an embodiment the suspension is a mixture of one or more metals, one or more ceramic powders, and a fatty acid, where the aim is to create a cermet or a metal matrix composite material. Such as a mixture may be between calcium salts and/or silica and/or alumina with copper and/or a copper alloy and/or steel.

In an embodiment the suspension comprises a fatty acid and one or more electrically conductive materials such as silver, copper, graphite, graphene or carbon nanotubes. Such compositions may be used for creating an electrically conductive and/or anti-static and/or electromagnetic shielding and/or sensor and/or electrode object.

In yet an embodiment the suspension comprises an unsaturated fatty acid, where the unsaturated fatty acid's double or triple bonds are crosslinked or reacted with other components during or after 3D printing or extrusion with the aim of mechanically stabilizing the printed object.

In a more specific embodiment, the suspension consists of the metallic, and/or ceramic, and/or polymeric material and fatty acid. In another embodiment, the suspension is free from Plasticine and/or modelling clay.

In another embodiment, the suspension according to the invention, comprises at least 80% solid material and 5-20% fatty acid, preferably at least 80% solid material where the remainder is at least 50% fatty acid, such as 75% fatty acid, such as 90% fatty acid, such as, or 99% fatty acid, or the remainder is 100% fatty acid.

In certain cases, it may be preferred that the suspension is free or substantially free from water. Thus, in an embodiment, the suspension comprises less than 1% by weight water, preferably, the suspension is non-aqueous.

The suspension may also be non-newtonic. Thus, in an embodiment the suspension is non-newtonic or a Bingham plastic.

For medical equipment it is of course important that the body can tolerate the generated material. Thus, in an embodiment, the ceramic, polymer and/or metal is biocompatible. In another embodiment, the ceramic, polymer and/or metal is biodegradable. In yet an embodiment, the biodegradable material is selected from the group consisting of calcium phosphates, calcium sulfates, PCL, PLA, PGA, PHB, PHV, PHA or co-polymers thereof as well as alloys of magnesium and/or iron and/or calcium. Example 5 shows biocompatiby tests in mice using TCP.

To avoid evaporation, it may be beneficial that the vapour pressure of the fatty acid at room temperature (25° C.) is not too high. Thus, in an embodiment, the fatty acid has a vapour pressure at room temperature of no more than 17.5 mmHg.

It is of course to be understood that the suspension may comprise more than one solid material. Thus, in an embodiment, the suspension comprises two or more metallic materials and/or two or more ceramic materials and/or two or more polymeric materials or mixtures thereof.

The (free) fatty acid may be generated in different ways. Thus, in an embodiment, the suspension comprises completely or partially hydrolysed triglycerides and/or phospholipids, wherein the suspension may contain one or more fatty acids with or without glycerol or glycerol conjugated compounds.

The suspension may also comprise other constituents. Thus, in an embodiment, the suspension further comprises one or more of water, polymers, emulsifiers, solvents, binders, cross-linkers, surfactants, viscosity modifiers, anti-oxidants, anti-microbial compounds, dispersants, plasticizers, flocculants, polycarboxylates, polyacids, polybases, chromophores, pigments, soaps, glycerol, phospholipids, alkanes, alcohols, ethers, aldehydes, ketones, esters, amines and thiols, phosphates, sulfates, sulfonic acids and superplasticizers.

Use of Suspension

As described above and in the example section, the suspension according to the present invention, is especially suited in 3D printing processes. Thus, an aspect of the invention relates to the use of a suspension according to the invention in a 3D printing or extrusion process, preferably a 3D printing process. Phrased in another way, in yet an aspect the invention relates to the use of a suspension according to the invention, as a feedstock, an ink, a deposited material or an extruded material for a 3D printer or an extruder.

In another aspect the invention relates to the use of a suspension comprising
- 50-95% by weight of the total suspension (w/w) of at least one ceramic material; and/or metallic material and/or polymeric material and/or carbon containing material, such as graphite; and
- at least 5% by weight of the total suspension (w/w) of one or more fatty acids or derivatives thereof;

in a 3D printing or extrusion process.

As also outlined above, the suspension according to the invention has several advantages in e.g. 3D printing processes. Thus, in an embodiment, the use is for avoiding precipitation and/or cementation of the feedstock/ink prior and/or during and/or after printing or extrusion. In a further embodiment, the use is for avoiding oxidation of metal material during sintering, with the proviso that the suspension comprises metal material. In another embodiment, the use is for improving the tolerance of the object, its form and shape retention and its mechanical strength prior to post-printing processing. This is achieved by printing the suspension at a temperature above the melting point of one or more of its constituent fatty acids onto a stage or object with a temperature that is lower than the melting point of one or more of its constituent fatty acids so that it freezes and stiffens after deposition. In yet an embodiment, the use is for increasing the tensile strength and/or flexural strength and/or compressive strength and/or shear strength of the 3D printed or extruded object. As shown in example 1, a particular high content of solid material can be printed with the suspension according to the invention. Such high content increases the strength of the printed material. In yet an embodiment, the suspension is for increasing the density of the 3D printed or extruded material. In yet an embodiment, the suspension is for increasing the biocompatibility of the 3D printed or extruded material.

The data provided in Example 1, indicates that the material printed with the suspension according to the present invention has a high biocompatibility. Thus, in an embodiment, the suspension is for increasing the biocompatibility of the 3D printed or extruded material.

The 3D printing process may be selected from different technologies. Thus, in an embodiment, the 3D printing process is selected from the group consisting of robocasting, direct ink writing, ink jet printing, binder jetting, selective heat sintering, selective laser sintering, selective laser melting, stereolithography, filament printing, pellet printing, material printing, freeform fabrication, rapid prototyping and deposition from a robotic arm.

Process for 3D Printing or Extruding a 3-Dimensional (3D) Object

The present invention also relates to a process for producing a 3D object using the suspension according to the invention. Thus, in an aspect the invention relates to a process for 3D printing or extruding a 3-dimensional (3D) object, the process comprising
a) providing a suspension according to the invention;
b) 3D printing or extruding the object using the suspension as a feedstock; and
c) optionally, solidifying the printed or extruded material, e.g. by a method selected from the group consisting of sintering, hydrating, coating, melting, infiltrating, freezing, crystallizing, precipitating and/or crosslinking the 3D printed or extruded material.

In a further aspect the invention relates to a process for 3D printing or extruding a 3-dimensional (3D) object, the process comprising
a) providing a suspension comprising
- 50-95% by weight of the total suspension (w/w) of at least one ceramic material; and/or metallic material and/or polymeric material and/or carbon containing material, such as graphite; and
- at least 5% by weight of the total suspension (w/w) of one or more fatty acids or derivatives thereof.
b) 3D printing or extruding the desired object using the suspension as a feedstock; and
c) optionally, solidifying the printed or extruded material by a method selected from the group consisting of sintering, hydrating, coating, melting, infiltrating and/or crosslinking the 3D printed or extruded material. Preferably a sintering step is included.

As shown in the example 1, the 3D printed objects, formulated with fatty acid based suspensions, have superior properties compared to other 3D printed materials, such as a higher compressive strength and better biocompatibility. It is to be understood that the printed object may be a composite material comprising several (different) printed materials. Such composite material may be generated by printing simultaneously from different printing nozzles, or by a stepwise procedure, with or without an intermediate solidification step such as sintering.

The nozzle size of a printer/extruder may determine how precise an object can be generated. Thus, in an embodiment said 3D printing takes place through one or more nozzles, wherein the area of the orifice of each nozzle is in the range 10 μm² to 2000 μm², such as 50-2000 μm², such as 50-1000 μm², such as 50-500 μm².

Sintering of a generated object may take place at different temperatures depending on the material. Thus, in yet an embodiment said sintering takes place by heating the entire object to a temperature in the range 150 to 3000° C., such as in the range 250 to 350° C., such as in the range 300 to 400° C., such as in the range 400 to 500° C., such as in the range 600 to 700° C., such as in the range 900 to 1000° C., such as in the range 1000 to 1200° C., such as in the range 1200 to 1400° C., such as in the range 1400 to 1700° C., or such as in the range 1700 to 2500° C.

In yet a different embodiment, the sintering process takes place in two steps, the first to carbonize the fatty acid and the second to oxidize the carbon and sinter the particles. This could e.g. be 1 hour at 400° C. and 2 hours at 1100° C. in the case of stearic acid and TCP.

In yet another embodiment, the sintering process takes place under atmospheric pressure or under partial vacuum. Ovens that operate at atmospheric pressure are simpler and cheaper, whereas ovens that operate at partial vacuum may reduce oxidation of the 3d printed object and help with the removal of fatty acids through evaporation or sublimation.

In a further embodiment, the sintering process takes place in atmospheric air. Ovens that operate with atmospheric air are simpler and cheaper.

In another embodiment, the sintering process takes place in air comprising more than 80% argon and/or nitrogen. Ovens that operate with protective gasses may reduce oxidation of the 3D printed object.

The printed objects may also have a substantial size. Thus, in a further embodiment, the 3D printed or extruded 3-dimensional object has a volume of at least 1 cm³, such as at least 10 cm³, such as in the range 1-1000 cm³ or such as 1-100 cm³.

The generated objects may be for medical purposes. Thus, in an embodiment, the object is a medical implant, such as a bone or dental implant. Example 4 describes printing of bone implants.

The printed objects comprising metal, may be particular relevant within certain industrial fields. Thus, in an embodiment, the 3D printed or extruded 3-dimensional object comprises metal and is selected from the group consisting of whole items, parts or components of medical devices, medical implants, electronics, power electronics, robots, machinery, turbines, tubes, fittings, armour, weapon systems, cars, motorcycles, bicycles, aircraft, spacecraft, ships, submarines, oil platforms, mining equipment, wind turbines, offshore installations, armoured vehicles, tanks, heterogeneous chemical catalysts, engines, tanks, containers, drilling equipment, buildings, power plants, art, jewellery, household items and toys.

The printed objects comprising ceramics, may also be particular relevant within certain industrial fields. Thus, in an embodiment the 3D printed or extruded 3-dimensional object comprises ceramics and is selected from the group consisting of whole items, parts or components of medical devices, medical implants, tooth or bone replacement materials, thermal insulation, electric insulation, acoustic insulation, armour, weapon systems, refractory materials, engines, power plants, electronics, turbines, wind turbines, heterogeneous chemical catalysts, buildings, bridges, roads, dams, infrastructure, art and pottery.

The temperature during printing may also vary. Thus, in yet an embodiment, step b) is carried out at a temperature in the range 10-30° C., such as 15-25° C., or in the range of 30-100° C., such as 40-80° C., such as 50-70° C., or such as 60-70° C.

It is to be understood that this temperature relates to the temperature of the suspension before and/or during 3d printing or extrusion and that the temperature immediately after deposition such as on the stage or platform may be lower, the same or higher.

The temperatures below 30° C. may be relevant for fatty acids (or the suspension is general) being liquid at that temperature range. On the other hand temperatures in the range 30-100° C. may be relevant if a suspension is used, which have a melting temperature in that range. If such material is printed into a cooled environment, the material will solidify after printing extrusion. Examples of fatty acids having a melting temperature in the temperature range 30-100° C. are decanoic acid (capric acid), dodecanoic acid (lauric acid), tetradecanoic acid (myristic acid), hexadecanoic acid (palmitic acid), octadecanoic acid (stearic acid), eicosanoic acid (arachidic acid), docosanoic acid (behenic acid), tetracosanoic acid (lignoceric acid).

3-Dimensional Object Obtained/Obtainable by the Process

In yet another aspect, the invention relates to a 3D printed or extruded 3-dimensional object obtained/obtainable by a process according to the invention.

Other Aspects of the Invention

The present invention may be defined by different product combination.

In a further aspect, the invention relates to a 3D printer loaded with suspension according to the present invention. It is to be understood that the 3D printer is loaded with the suspension making it possible to 3D print the suspension. Thus, the suspension is loaded as a feedstock.

In yet an aspect the invention relates to a kit comprising
  a 3D printer; and
  a suspension according to the invention.

In yet a further aspect, the invention relates to a kit comprising
  a 3D printer; and
  instructions for printing a 3D object using the suspension according to the invention as a feedstock.

In another aspect, the invention relates to a kit comprising
  a suspension according to the invention; and
  instructions for printing a 3D object using the suspension as a feedstock.

Yet another aspect relates to a kit comprising
  one or more fatty acids according to the present invention; and
  instructions for using the one or more fatty acids to prepare a suspension according to the invention, for use as a feedstock in a 3D printer or extruder.

It is to be understood that the fatty acids relates to the fatty acids forming part of the suspension according to the invention.

In an embodiment, the kit further comprises one or more materials as defined by the present invention.

In yet another aspect the invention relates to a kit comprising
  one or more materials according to the present invention; and instructions for using the one or more materials to prepare a suspension according to the present invention, for use as a feedstock in a 3D printer or extruder.

It is to be understood that the materials or powders relate to the materials/powders forming part of the suspension according to the invention.

In an embodiment, the kit further comprises one or more fatty acids according to the present invention.

In an embodiment the invention relates to the use of the 3D printed but non-sintered object as a medical implant where the fatty acid acts as a biocompatible and resorbable component. The suspension according to the invention also advantageous compared to other printable materials as the suspension may be free from non-biocompatible and/or non-resorbable materials such as paraffin, alkanes, waxes, mineral oils, petroleum jelly, polypropylene, polyethylene and polymers that undergo no or limited degradation and/or resorption in the human body. Thus, in an embodiment the suspension does not comprise a component selected from the group consisting of paraffin, alkanes, waxes, mineral oils, petroleum jelly, polypropylene, polyethylene and polymers that undergo no or limited degradation and/or resorption in the human body.

Thus, the suspension according to the invention may in an embodiment be composed of (consist of) only stearic acid and tricalcium phosphate, both biocompatible and resorbable materials.

In another an embodiment the invention relates to the use of the extruded mixture of one or more fatty acids with one or more solid components as an injectable or otherwise implantable medical void filler, cement, glue, bone cement or tissue glue.

In yet an embodiment, the invention relates to the use, wherein the suspension further comprises one or more hydrophilic polymer components, such as collagen, gelatin, elastin or hyaluronic acid, so as when combined with fatty acids they form a scaffold, hydrogel and/or extracellular matrix when the fatty acid leaves the mixture.

In yet an embodiment, the invention relates to the use of the suspension, where it is composed in such a way that it forms a cement when the fatty acid leaves the mixture. For example by combining different calcium and/or phosphate salts and/or phosphoric acid such as tricalcium phosphate with monocalcium phosphate.

In yet an embodiment, the suspension further comprises one or more drugs, pharmaceutics or other bioactive compounds, with the aim of releasing these from the implant to the local environment and/or to systemic circulation. In a similar embodiment the invention relates to the use of the 3D printed implant as an implantable drug release and/or drug reservoir system.

In yet an aspect the invention relates to the 3D printing of the suspension used as a solidified suspension powder made for example by crushing or milling a mixture of fatty acids with solid powder. This suspension powder may be deposited onto a heatable surface where it may be melted and fused. The suspension powder may also be placed onto the build area as successive layers that are treated with heat, laser or electron beams to selectively sinter or melt the suspension powder to fuse it in a manner similar to selective heat sintering/melting or selective laser sintering/melting.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1—Printing of Ceramic Material

Using tricalcium phosphate (TCP) as the solid material, the following inks/feedstocks were formulated:

| Number | 1 | 2 | 3 | 4 | 5 | 6 | 7 | 8 | 9 |
|---|---|---|---|---|---|---|---|---|---|
| M(TCP)/g | 12.5 | 12.5 | 12.5 | 18 | 15 | 15 | 15 | 15 | 15 |
| M(HEC)/g | 1.25 | 1.25 | 0.5 | 1.25 | 0.5 | 2.5 | 2 | 1.5 | 1.25 |
| M(H$_2$O)/g | 12.5 | 25 | 15 | 15 | 15 | 15 | 15 | 15 | 15 |

HEC: hydroxyethylcellulose
TCP: The employed TCP had a average particle size in the range 1-5 micrometer.

10. 15 g (75% w/w) TCP and 5 g Sunflower oil (25% w/w)
11. 15 g (75% w/w) TCP and 5 g Glycerol (25% w/w)
12. 15 g (75% w/w) TCP and 5 g Lanolin (25% w/w)
13. 15 g (75% w/w) TCP and 5 g Cod Fish Oil (25% w/w)
14. 15 g (75% w/w) TCP and 5 g Oleic Acid (25% w/w)
15. 20 g (80% w/w) TCP and 5 g Oleic Acid (20% w/w)
16. 25 g (83.3% w/w) TCP and 5 g Oleic Acid (16.7% w/w)

In each case the inks were printed into rectangular mechanical test specimens (100 mm×20 mm×5 mm) using a Hyrel System 30M 3D printer with an EMO-25 dispenser with a 19:1 gear reduction and a 1 mm nozzle. The aqueous prints were dehydrated overnight at 200° C. in a forced circulation air drier. All prints were then sintered at 1050° C. for 2 h. Some of the samples were then infiltrated with polycaprolactone by dipping then in a 15% solution of polycaprolactone in acetone until bubbling ceased after which they were air-dried. A number of problems were encountered; inks 1-9 became hollow if not air dried prior to sintering, of these ink 9 was the best printable gel with the highest solid loading. Ink 10 behaved well in our hands but was not printable as the oil was pressed out through the nozzle leaving the solid particles in the dispenser as soon as pressure was applied. Ink 11 did not form a printable ink. Ink 12 formed a printable gel but the lanolin melted and became liquid during the sintering destroying the sample. Ink 13 performed well during printing and sintering, we suspected that this was because codfish oil has a high content of "free" fatty acids. Ink 14-16 all performed well during printing and sintering.

In sum, using "free" fatty acids, makes it possible to 3D print feedstocks with a higher content of solids, such as TCP.

Figure 1:
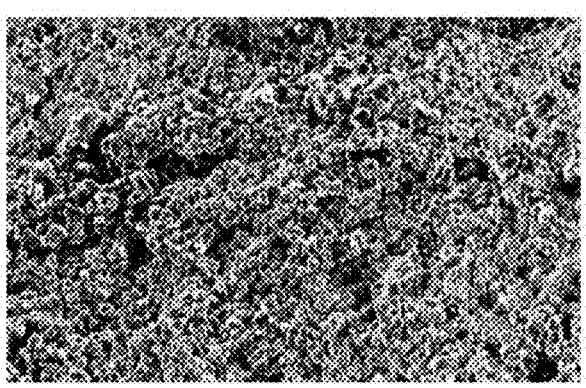
FIG. 1 shows scanning electron microscopy (SEM) pictures of β-Tricalcium Phosphate (TCP) printed using two different ink compositions:
(1) Containing 1.25 g hydroxyethylcellulose (HEC), 15 g $H_2O$ and 15 g TCP
(2) Containing 5 g oleic acid and 25 g Tricalcium Phosphate. Non-sintered and Sintered (1050° C., 2 h) samples are shown, as are those of 1× or 2× polycaprolactone coated sintered samples.
Figure 1:
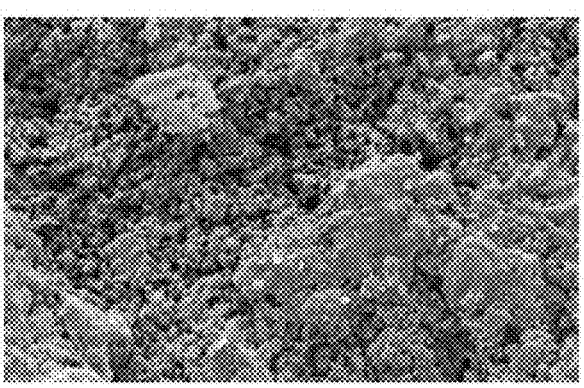
Figure 1:
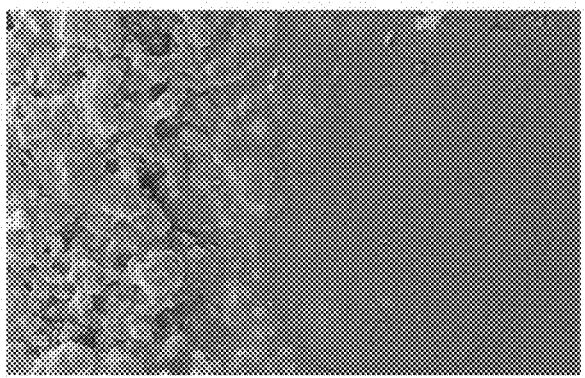
Figure 1:
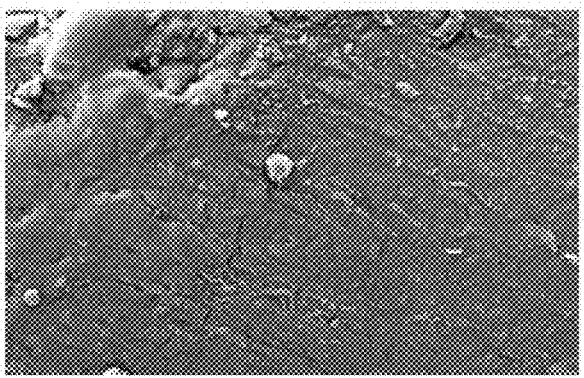
Figure 1:
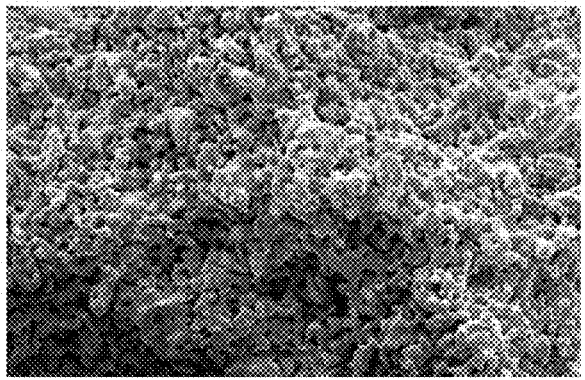
Figure 1:
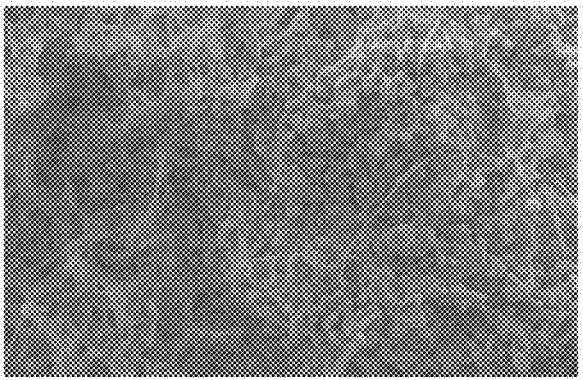
Figure 2:
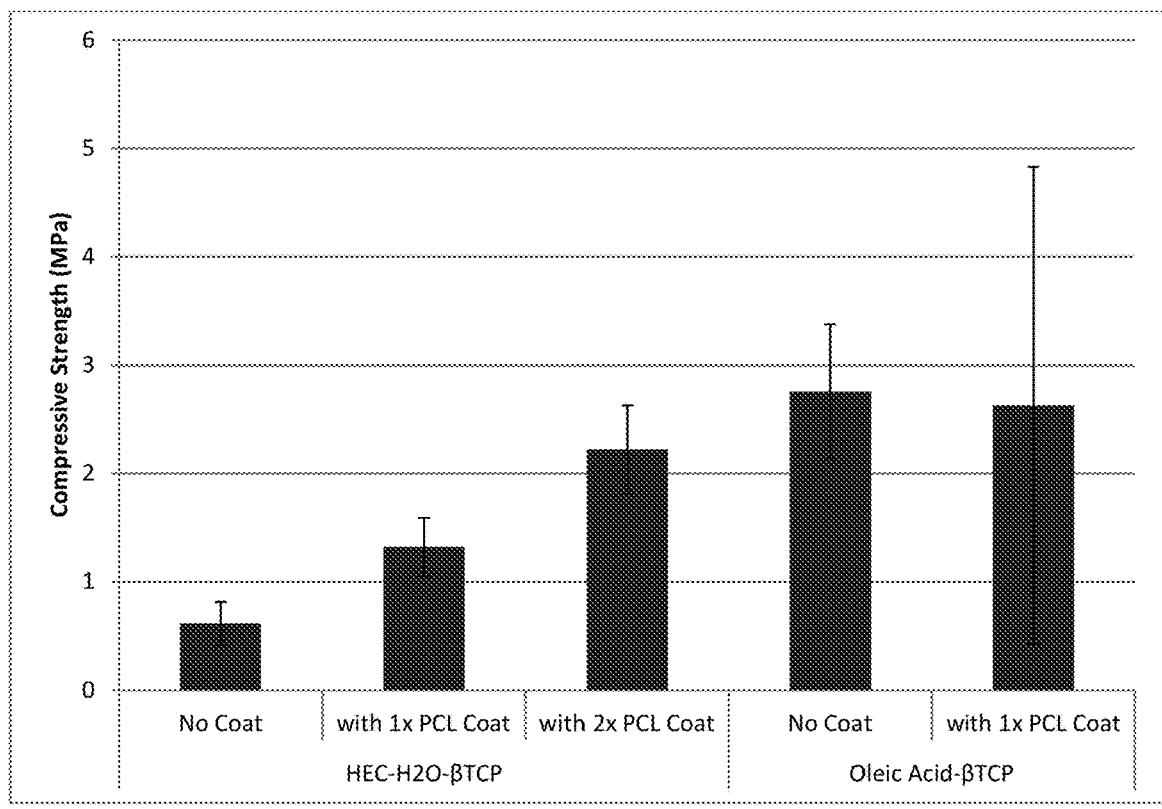
FIG. 2 shows the result of compressive testing of β-Tricalcium Phosphate (TCP) printed using two different ink compositions:
(1) Containing 1.25 g hydroxyethylcellulose (HEC), 15 g $H_2O$ and 15 g TCP
(2) Containing 5 g oleic acid and 25 g TCP.
With 1× or 2× or without coating with polycaprolactone.
Figure 3:
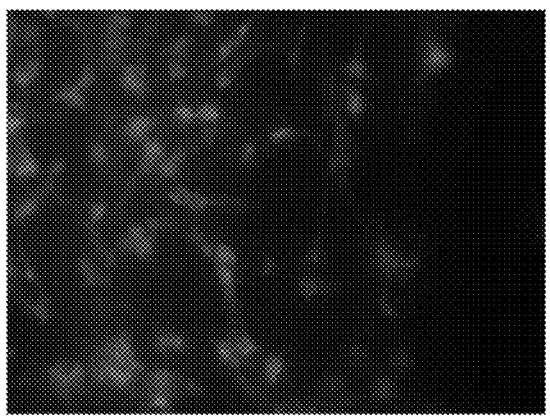
FIG. 3 shows the result of cultivating mesenchymal stem cells on structures printed with aqueous and fatty acid based colloidal inks. 200000 cells were seeded on TCP pieces weighing on average 56 mg and were cultivated for 15 days in maintenance or osteogenic medium before being photographed using a fluorescence microscope or assessed for viability using a CellTiter assay.
Figure 3:
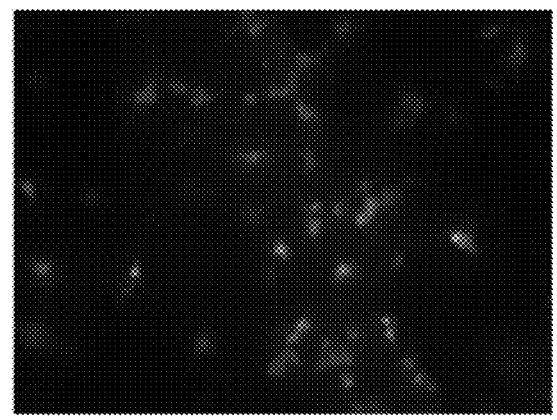
Figure 3:
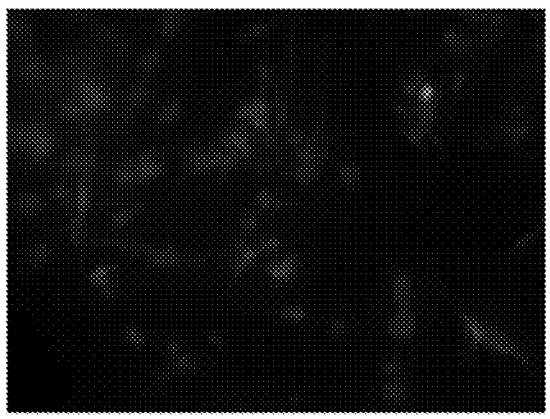
Figure 3:
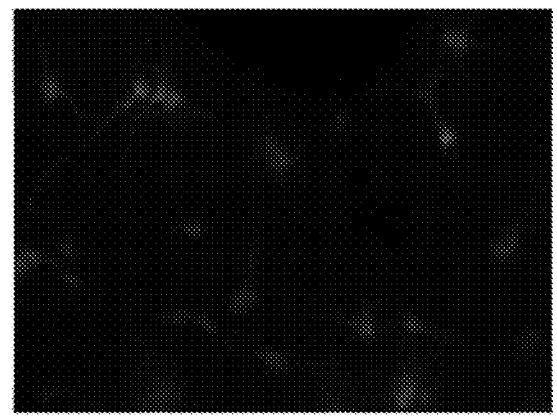
Figure 3:
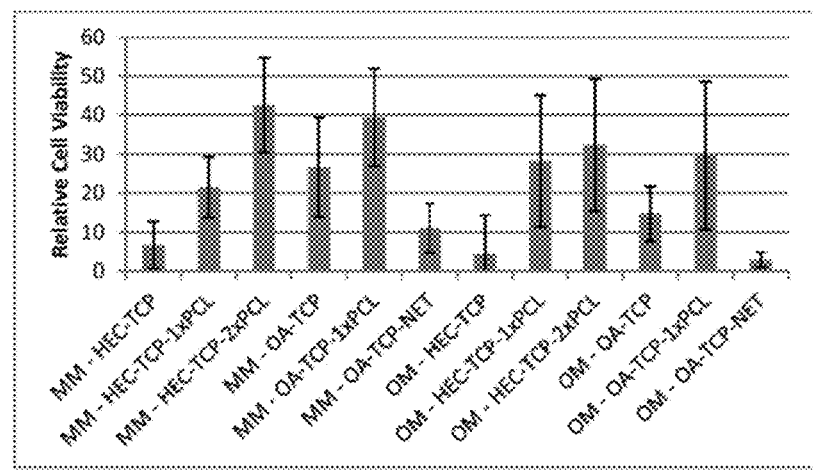
Figure 4:
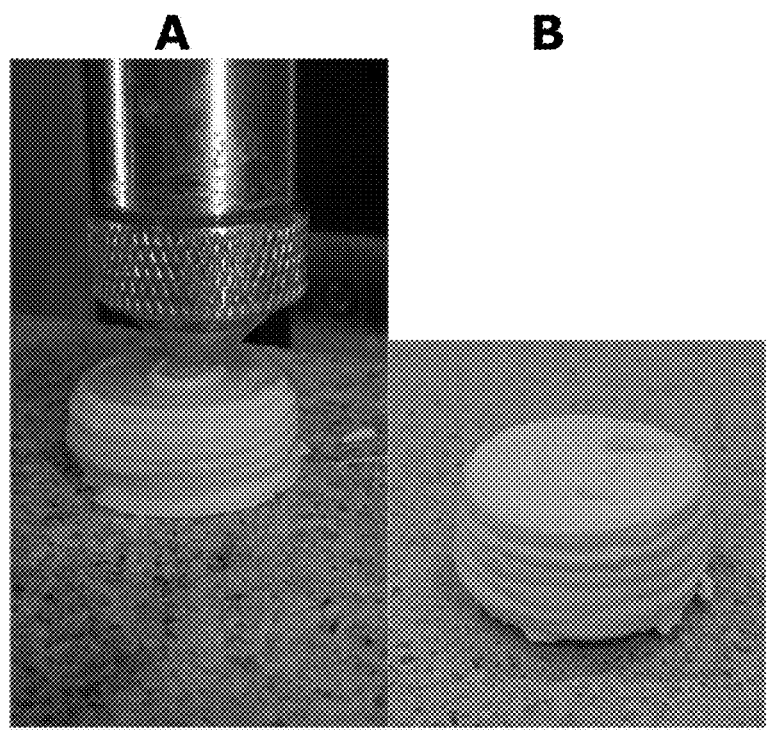
FIG. 4 shows photographs of TCP/linoleic acid and TCP/oleic acid inks. A) TCP/linoleic acid during printing; B) TCP/linoleic acid after sintering; C) TCP/oleic acid during printing; and D) TCP/oleic acid after sintering.
Figure 4:
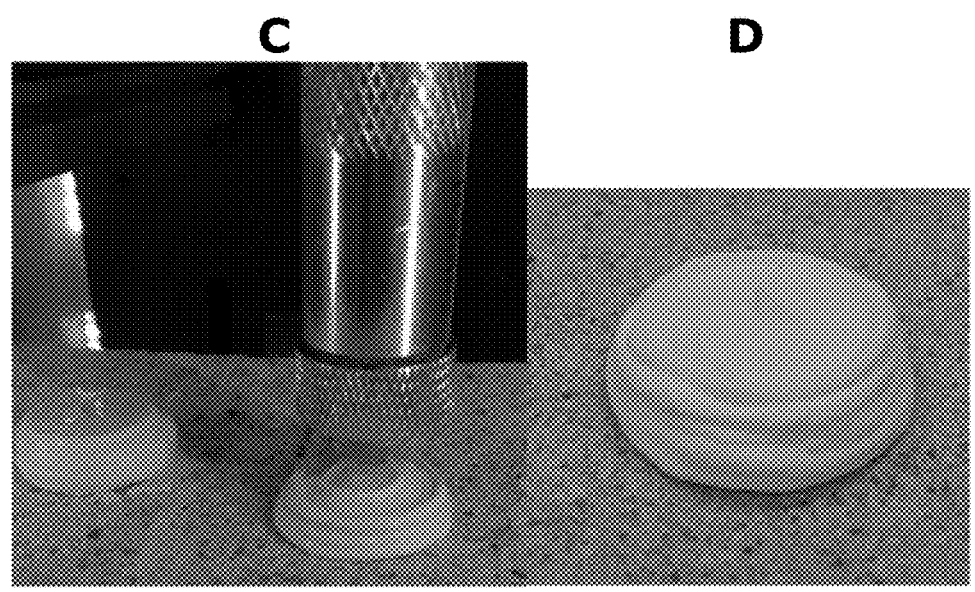

Finished samples made with inks 9 and 16 (the printable and sinterable gels with the highest solid loading) were visualized using scanning electron microscopy (FIG. 1). It can be seen that samples sinter well merging the colloidal particles. Polycaprolactone coating is evident in the coated samples. Some samples (N=5) were also tested for compressive strength using an Instron Mechanical testing device (FIG. 2). It was evident that objects printed with ink 16 were stronger than any of those made of ink 9, non-coated ink 16 objects were 3.13 times stronger than ink 9 objects. Samples for cell testing were etched in 0.25M NaOH for 24 h, 0.25M HCl for minutes and washed 4 times with H$_2$O and 2 times with 77% V/V ethanol before being air dried and seeded with 200.000 telomerase immortalized, green fluorescent protein expressing human mesenchymal stem cells (p68) in 200 uL MEM medium in non-adherence 96 well plates. Medium was changed after 24 hours to either maintenance medium or osteogenic medium and changed twice weekly thereafter. After 15 days, the cells were visualized using fluorescence microscopy and viability was assessed using celltiter (FIG. 3). The cells grew and attached well to all implants tested but viability testing (N=6) showed 4 times as many cells on the ink 16 based implants as compared to the ink 9 based implants.

Ink 16 based implants that had been coated one time with polycaprolactone had 1.8 times more viability than ink 9 based implants that had been coated one time with polycaprolactone.

It thus appears that TCP 3d printed with fatty acid based suspensions have higher biocompatibility than those 3d printed with water based suspensions.

Example 2—Test of Liquid Phases

The following inks/feedstocks were formulated and the following printing results were obtained using a Hyrel System 30M 3D printer with an EMO-25 dispenser with a 19:1 gear reduction and a 1 mm nozzle:

1. 26 g (83.9% w/w) TCP+5 g (16.1% w/w) Linoleic Acid: Printed well
2. 25 g (83.3% w/w) TCP+5 g (16.7% w/w) Oleic Acid: Printed well
3. 21 g TCP+5 g Oleyl Alcohol: Not printable, liquid phase runs out
4. 23 g TCP+5 g Oleyl Alcohol: Not printable, liquid phase runs out
5. 25 g (83.3% w/w) TCP+5 g (16.7% w/w) Oleyl Alcohol: Not printable, liquid phase runs out
6. 26 g TCP+5 g Oleyl Alcohol: Not printable, liquid phase runs out
7. 20 g TCP+5 g Methyl Oleate: Not printable, becomes hard under pressure
8. 22 g TCP+5 g Methyl Oleate: Not printable, becomes hard under pressure
9. 23 g TCP+5 g Methyl Oleate: Not printable, becomes hard under pressure
10. 25 g (83.3% w/w) TCP+5 g (16.7% w/w) Methyl Oleate: Not printable, becomes hard under pressure
11. 35 g TCP+15 g H$_2$O: Water drips from nozzle, does not print uniformly
12. 15 g TCP+15 g H$_2$O+1.25 g HEC (as ink 9 in example 1): Printable
13. 25 g (83.3% w/w) TCP+5 g (16.7% w/w) Stearic acid: Printable when heated, solid at room temp.
14. 25 g (78.1%) TCP+7 g (21.9%) Naphtenic Acid: Printable.
15. 27 g (81.8%) TCP+6 g (18.2%) Octanoic Acid: Printable.

Materials were printed as cylinders with a diameter of 2 cm and a height of 2 cm. Samples 1-15 were printed onto a dry platform and were then sintered at 1100° C. for 2 hours. The employed TCP had an average particle size in the range 1-5 micrometer.

Without being bound by theory, these results indicate:
That the acid groups is crucial to the printing process, as the non-printable combinations based on oleyl alcohol and methyl oleate demonstrate that it cannot even be replaced by an alcohol or an ester group.
That both natural long-chain fatty acids such oleic acid and linoleic acid, natural short chain fatty acids such as octanoic acid as well as synthetic non-linear fatty acids such as naphtenic acid may be used. Indicating the the essential features are an acid group and a hydrophobic hydrocarbon.

In sum, it is possible to 3D print ceramics using the feedstock suspension according to the present invention.

Example 3—Test of Printing Copper with Oleic Acid as the Liquid Phase

Figure 5:
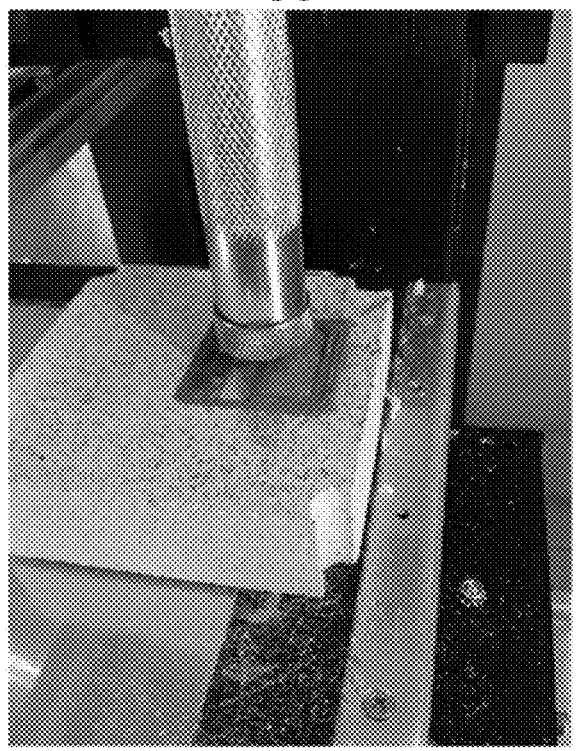
FIG. 5 shows photographs of copper/oleic acid inks being deposited using a 3D printer.
Figure 5:

The following copper/oleic acid ink was formulated and printed using a Hyrel System 30M 3D printer with an EMO-25 dispenser with a 19:1 gear reduction and a 1 mm nozzle:

1. 27 g (84.3% w/w) Copper+5 g (15.6% w/w) Oleic Acid: Printed well, see FIG. 5.

The printed Copper had a particle size below 75 micrometer.

In sum, it is possible to 3D print metal using the feedstock suspension according to the present invention.

Example 4—Printing Bone Implants

Figure 6:
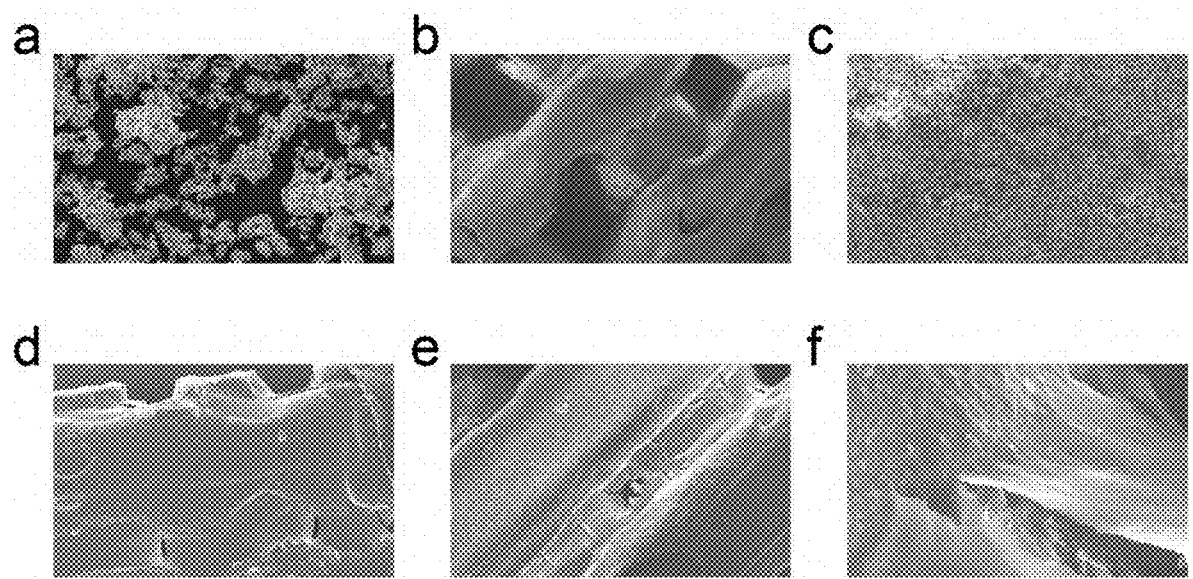
FIG. 6 shows scanning electron microscopy images. The following samples were imaged: TCP powder prior to use (a), sintered TCP implants at ×25 and ×1000 magnification (b and c), cell-seeded TCP implants after 2+25 days of cell culture in maintenance medium at ×25 magnification (d), cell-seeded TCP implants after 2+25 days of cell culture in osteogenic medium at ×30 and ×500 magnification (e and f).
Figure 7:
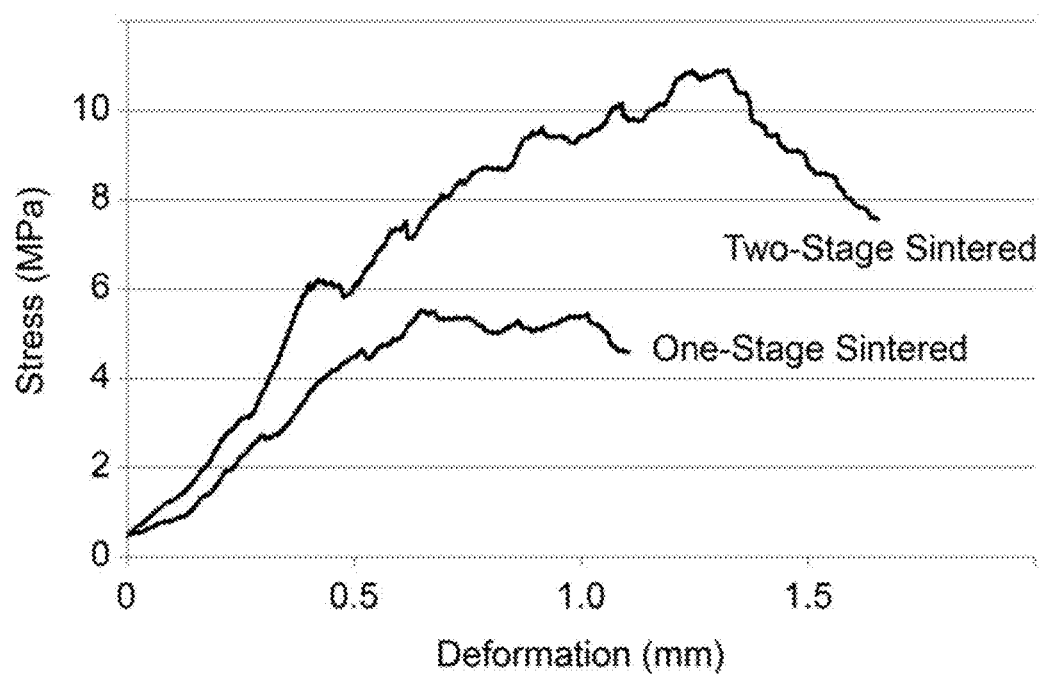
FIG. 7 shows compression testing of cubic (8 $cm^2$) TCP implants. Strain-Stress curves for compression testing were recorded (top figure) for two-stage sintered (400° C. and 1100° C., N=3) and one-stage sintered implants (1100° C., N=4), displayed are the average stress values of the implants from each group at the given deformation. Representative photographs of the sintered implants as seen from their top and side were taken before compression testing (bottom left and right figure, respectively), the two-stage sintered implants are seen to the left of each image.
Figure 7:
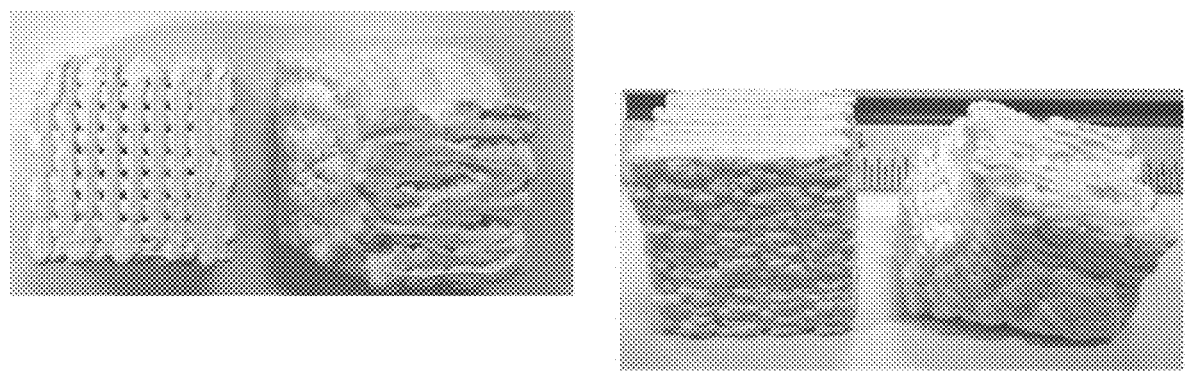
Figure 8:
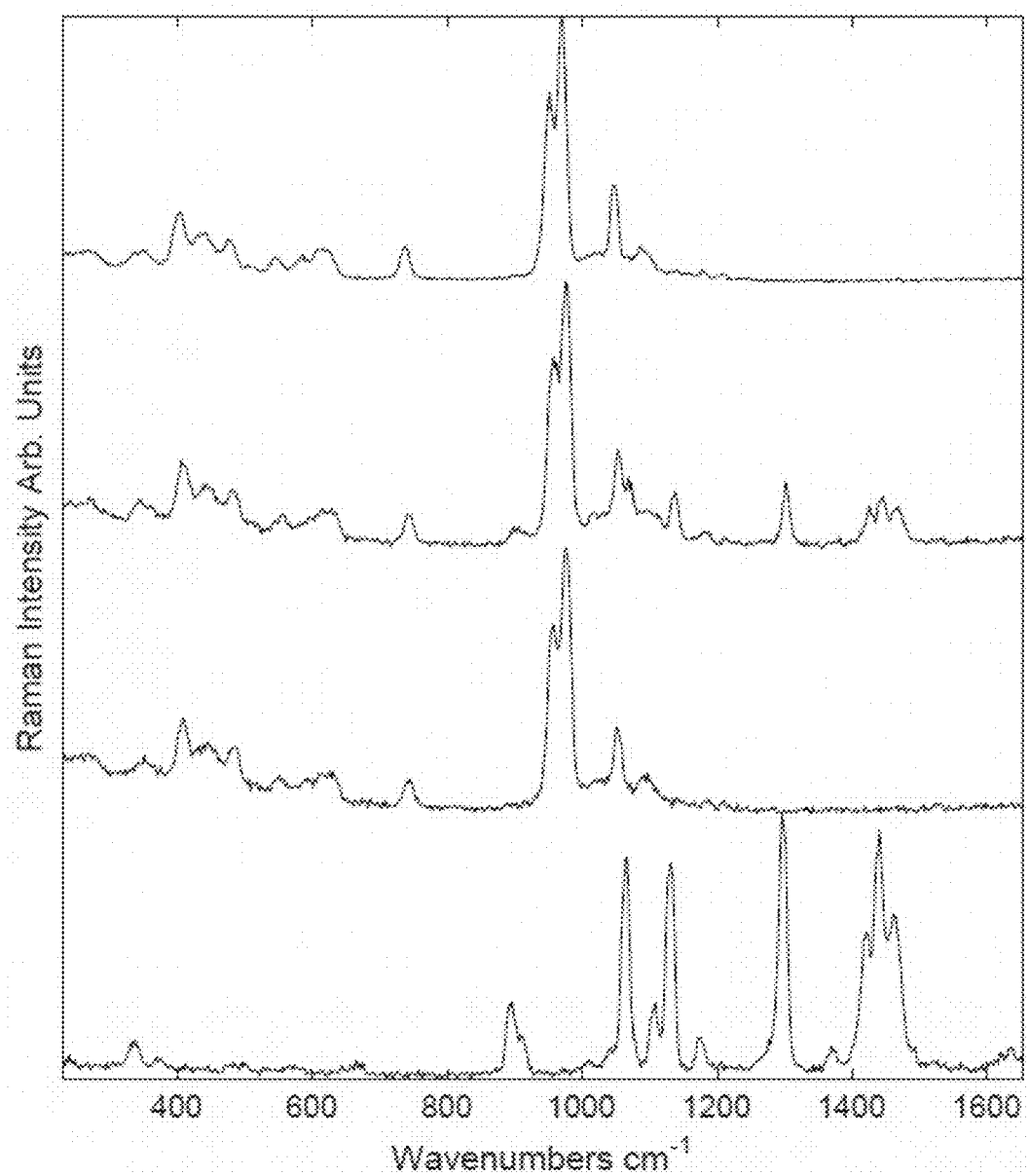
FIG. 8 shows a characterization of the sintering process. Raman spectra were collected (upper figure) of sintered implants (top), non-sintered implants (upper-middle), TCP powder (lower-middle), stearic acid powder (bottom). A photograph was taken (lower figure) of TCP powder (left-upper), stearic acid (left-lower), non-sintered implants (center-left), implants heated to 400 C for 1 hour (center-right) and fully sintered implants (right).
Figure 9:
FIG. 9 shows inverted microscopy pictures of cells growing in the implant pores at day 1, 2 and 2+7.
Figure 9:
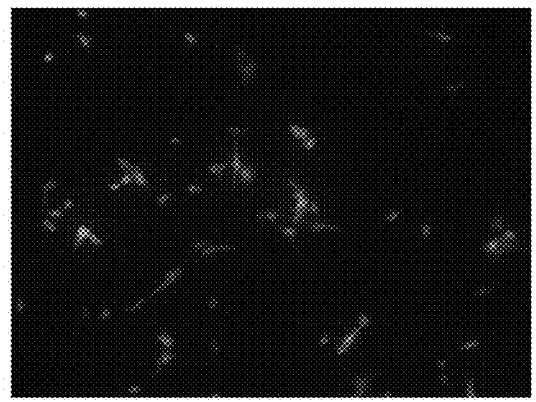
Figure 9:
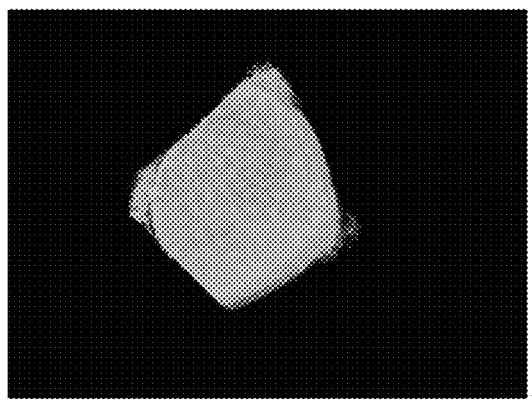
Figure 9:
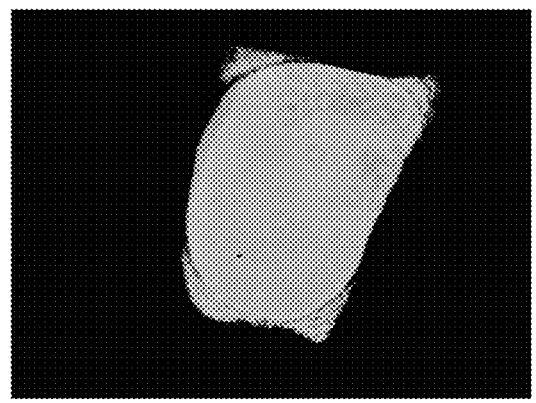
Figure 10:
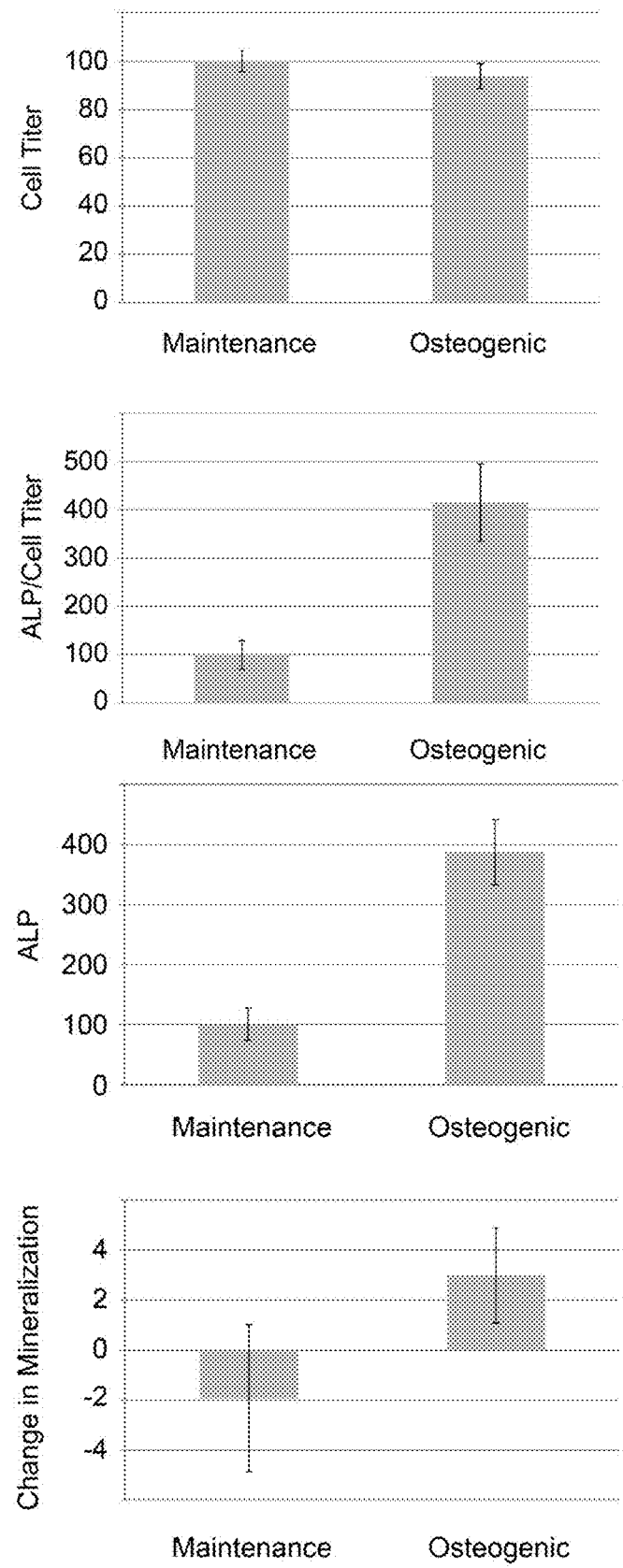
FIG. 10 shows cell titer and alkaline phosphatase activity (ALP) at day 2+7 (N=4) and change in mineralization at day 2+25 as compared to day 0 (N=4).
Figure 11:
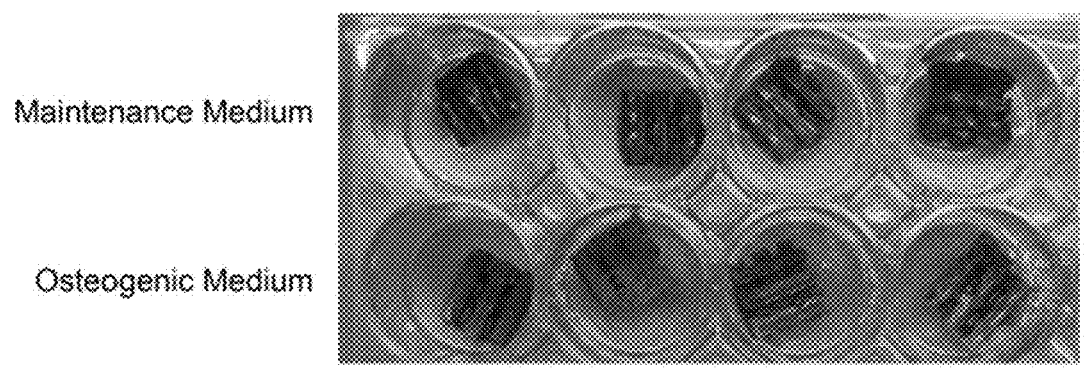
FIG. 11 shows staining of collagen and protein on implants (N=4, darker color=more collagen and protein) at day 2+7 (top). After staining at days 2+7 and 2+25 the stains were extracted from the implants (N=4) and quantified by absorbance spectrophotometry (N=4). MM and OM indicates maintenance medium and osteogenic medium.
Figure 11:
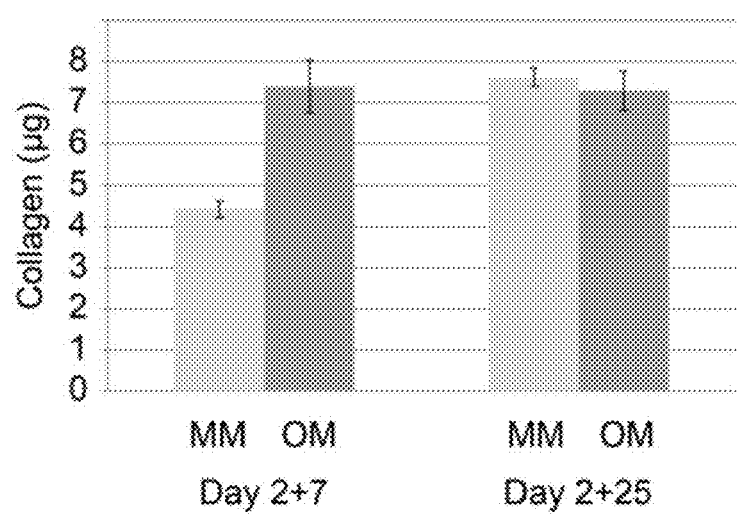
Figure 11:
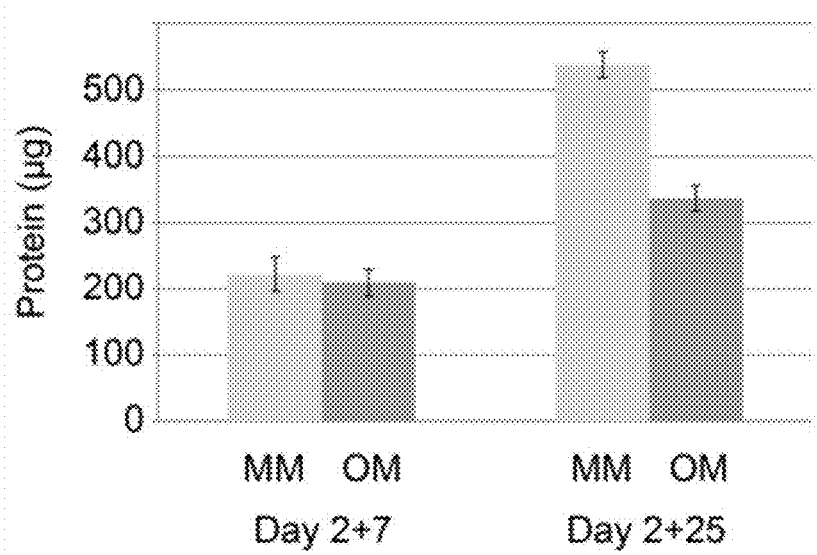

Stearic acid (5 g) and TCP (25 g) (average particle size in the range 1-5 micrometer) was 3d printed as a porous sheet from which smaller porous implants were made. The implants were sintered and seeded with 100.000 (eGFP+) or 200.000 (eGFP−) telomerase immortalized human mesenchymal stem cells. After 2 days of culturing, some of the cells were cultivated in an osteogenic medium. The sintering process and the resulting implants were characterized by scanning electron microscopy (FIG. 6), mechanical testing (FIG. 7), raman spectroscopy and photography (FIG. 8), microscopy (FIG. 9), micro-computed tomography and assays for viability and alkaline phosphatase secretion (FIG. 10) and collagen and protein deposition (FIG. 11).

Figure 12:
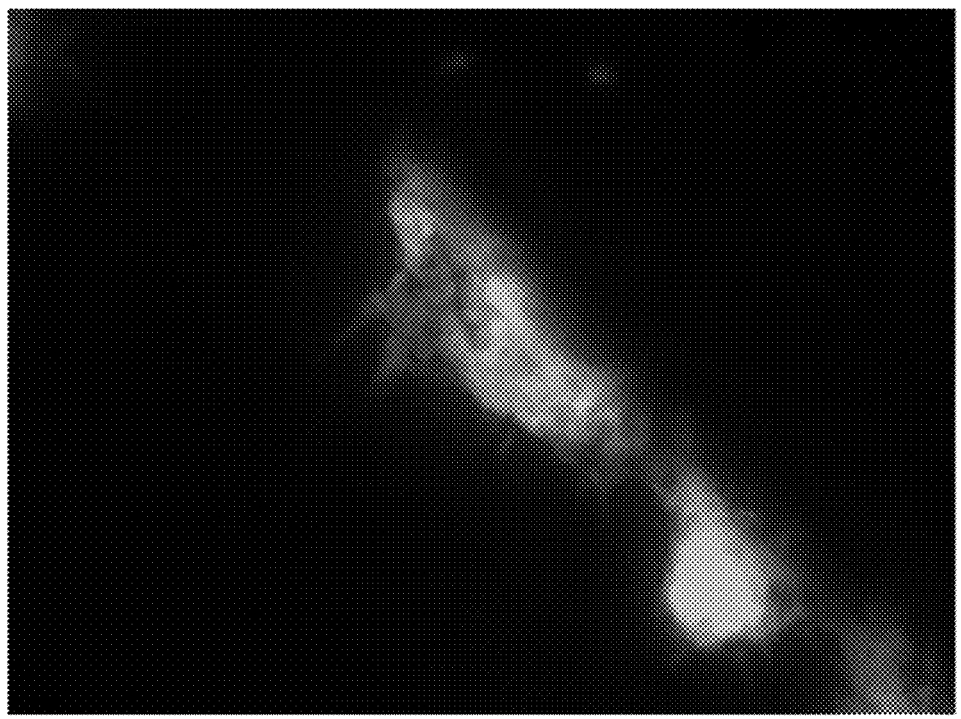
FIG. 12 shows an inverted fluorescence microscopy images of mesenchymal stem cells adhering to non-sintered 3D printed stearic acid/TCP at 24 h (top) and 48 h (bottom).
Figure 12:
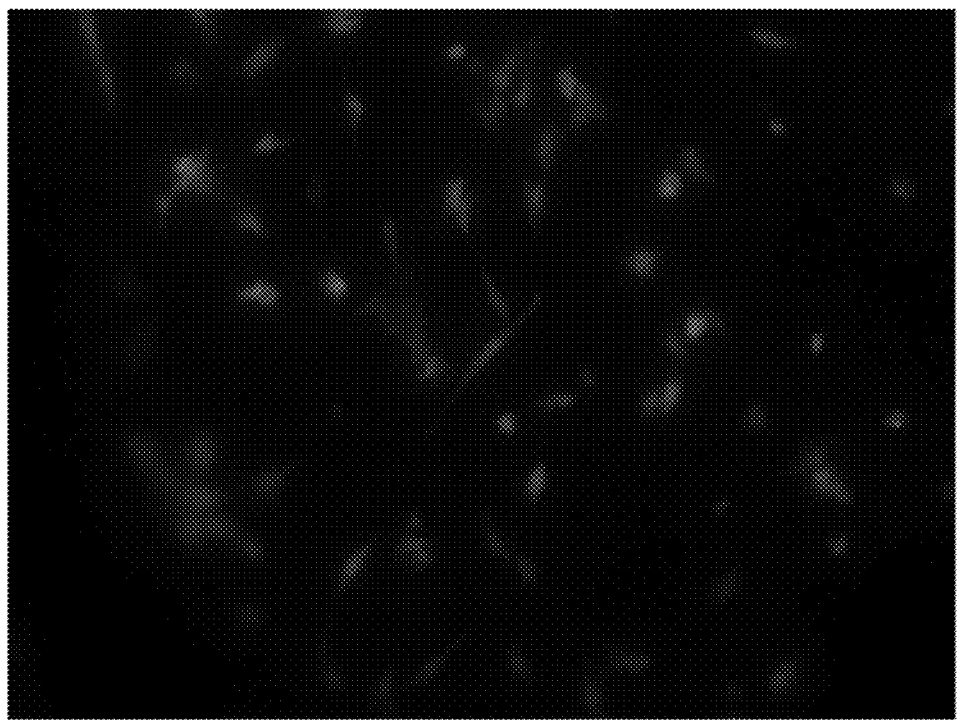

Scanning electron microscopy reveals that the powder is successfully sintered to fuse the TCP particles and that cells adhere onto the TCP surface. Mechanical testing reveals that implants can be sintered well as the fatty acid can be carbonized prior to sintering, sintering results in the porous implants achieving compressive strengths of 11.6 MPa (SD: 2.1 MPa). Raman spectroscopy shows that the sintered TCP is chemically identical to the TCP powder prior to 3D printing and sintering, thus now changes takes place during the processing. The microscopy reveals that mesenchymal stem cells adhere and grow on the TCP implants. The micro-computed tomography and assays for viability and alkaline phosphatase secretion show that the cells remain viable on the implants and that they can secrete alkaline phosphatase and mineralize the implants further. The collagen and protein deposition assay shows that the cells may deposit collagen and a protein matrix onto the implants. It was also found that when the stem cells were seeded into non-sintered SA/TCP implants they attached clumps (FIG. 12). After 48 hours the cells migrated onto the non-sintered implant surface and gained single cell morphologies indistinguishable from that of stem cells on sintered TCP at 48 hours.

In sum, it is possible to print and sinter bone implants that are mechanically strong, that are chemically identical to the starting material, that support cell growth and the formation of new bone in vitro.

Example 5. In Vivo Testing of Sintered and Non Sintered Implants

Sintered scaffolds (identical to those in example 4) and non-sintered scaffolds were crushed to a non-homogenous granulate using a mortar and pestle, 40 mg powdered material was placed in 1 mL syringes where the tips had been cut off, the syringe openings were blocked with cotton and the syringes were autoclaved to 120° C. The syringes were kept dry until shortly before the operation when they were added 200 µL saline solution. The powder from each syringe was in a sub-cutaneous pockets on the back of NOD-SCID mice. Each mouse carried 4 implant pockets each with identical implants.

Figure 13:
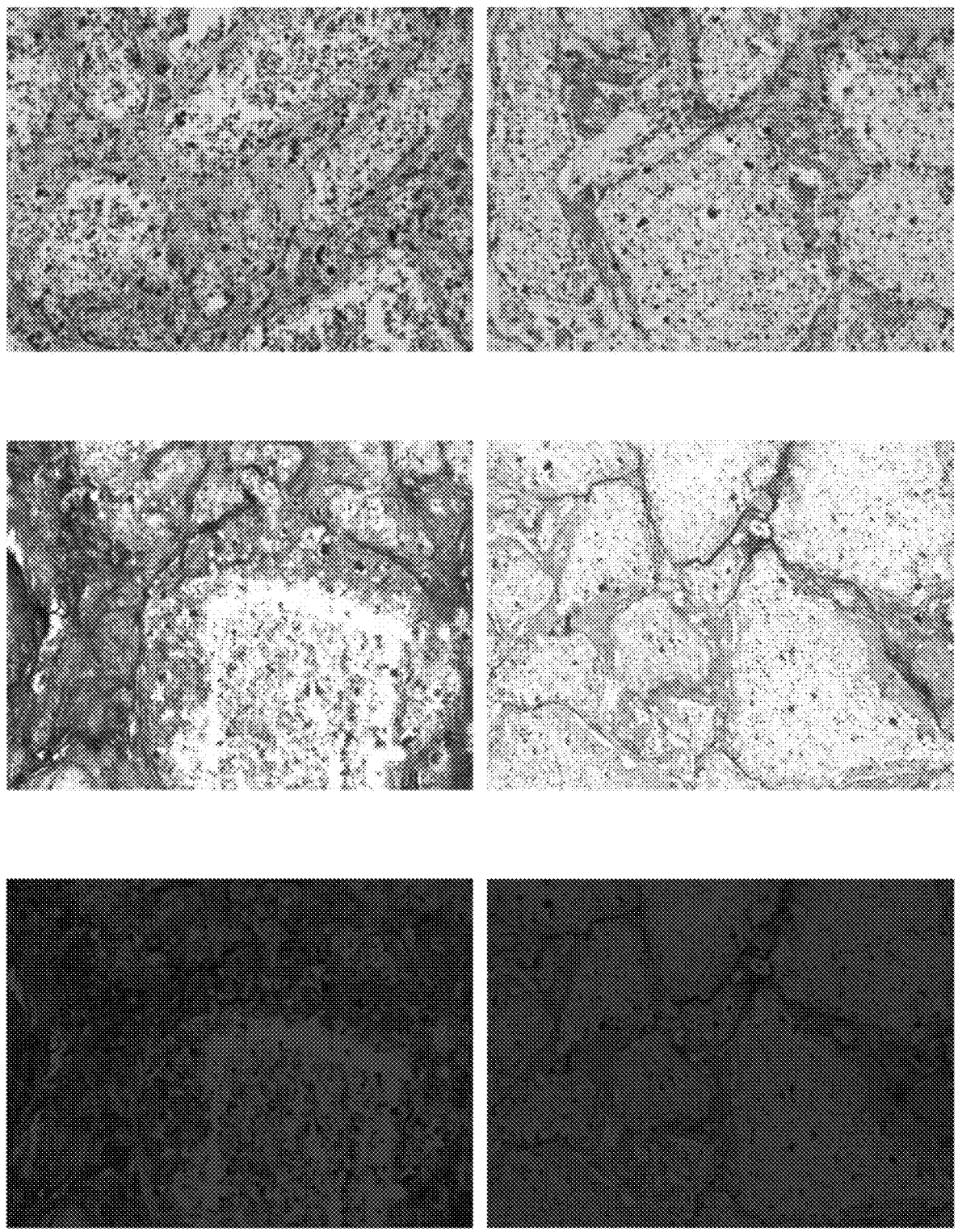
FIG. 13 shows histological stains of SA/TCP implants after 8 weeks of sub-cutaneous implantation in mice. Top: H&E Stains of Sintered (Left) and Non-Sintered (Right). Middle: Sirius Red Stains of Sintered (Left) and Non-Sintered (Right). Below: Polarized Sirius Red Stains of Sintered (Left) and Non-Sintered (Right)

The weights and appearance of the mice was monitored for 8 weeks and there was no significant weightloss and their appearance did not change. The mice were then euthanized and the implants were assessed histological (FIG. 13). It was observed that the mice looked fine, behaved normally and that there was no weight loss during the 8 weeks of implantation. The H&E staining showed that the implants were fully cellularized with cells residing both on and between the implant granulate, vascularization had occurred as evidenced by the presence of blood vessels inside the implants. Sirius red staining showed that collagen was deposited throughout the implants and when viewed in polarization light it was evident that the collagen was in many places organized.

In sum, the implants are highly biocompatible, support cell growth, vascularization and new bone formation in vivo.

Example 6. 3D Printing of Electrically Conductive Materials

Figure 14:
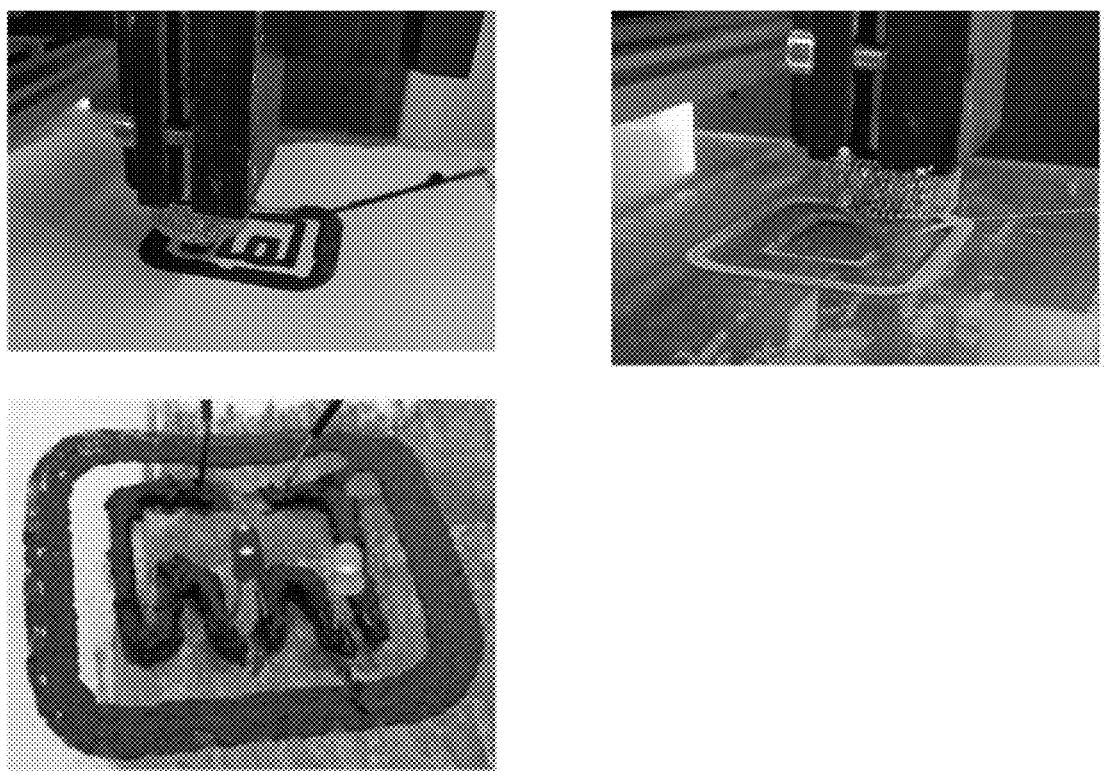
FIG. 14 shows stearic acid/graphite (top-left) and stearic acid/silver (top-right) being 3D printed. A simple circuit made in 3D printed graphite (lower-left) and a determination of conductivity in 3D printed straight wires using a multimeter (below).

Stearic acid was mixed with silver powder (5 g SA:40 g silver) or graphite powder (20 g SA:25 g graphite), these mixtures were deposited as a simple circuits, as rectangular electrodes (20 mm×30 mm×2 mm) or as straight lines (20 mm long, 2 mm wide) (FIG. 14).

The printed silver powder had a particle size in the range 0.5 micrometer to 2 micrometer.

Figure 15:
FIG. 15 shows ECG signals recorded through 3D printed electrodes. A) Regular electrodes; B) Silver stearic acid; C)

Some of the silver samples were sintered 1 hour at 400° C. and 2 hours at 700° C. The 3D printed circuit was tested using two LEDs that were placed in series and lit by electricity passed through the circuit. Conductivity was measured on the straight lines using a multimeter with standard copper wire and commercial conductive 3D printable filament as controls. ECG signals were collected through 3D printed electrodes or standard electrodes and were recorded using a Powerlab 26T unit and labchart software provided by ADInstruments (FIG. 15).

In sum, electrically conductive materials may be 3D printed and conductivity may be achieved in non-sintered implants. Two uses for these materials may be for circuits or sensors.

Example 7. 3D Printing of Metals with Stearic Acid

Stearic acid was mixed with copper (5 g SA:50 g Copper) or steel (15 g SA: 100 g Steel), heated and deposited onto a surface to build up objects (FIG. 16).

The employed copper (SPHERICAL, APS 10 MICRON) had an average particle size around 10 micrometer.

The employed steel was a type 316-L (Mesh 325). Thus, the particles have a size equal to or below 44 micrometer.

In sum, mixing metal powders with stearic acid enable heated deposition and subsequent solidification of the SA/metal mixture.

Example 8. Deposition of Stearic Acid and TCP using a Glue Gun

Stearic acid was mixed with TCP (average particle size in the range 1-5 micrometer) (5 g:25 g) and was cast into rods. These were placed in a standard glue gun and were deposited onto a surface by hand (FIG. 17).

In sum, the suspensions according to the invention do not necessarily have to be 3D printed, but can be extruded or deposited from other devices. It may for example have value as an injectable cement or void filler.

The invention claimed is:

1. A process for 3D printing a 3-dimensional (3D) object, the process comprising:
    a) providing a suspension comprising:
        60-95% by weight of the total suspension (w/w) of at least one polymeric material and/or metallic material; and
        at least 10% by weight of the total suspension (w/w) of one or more fatty acids or derivatives thereof; and
    b) 3D printing the desired object using the suspension as a feedstock;
    wherein said fatty acid derivatives comprises at least one acid group from the group consisting of carboxylic acid, phosphonic acid and sulfonic acid group attached to at least one C5-C30 hydrocarbon.

2. The process according to claim 1, comprising at least one polymeric material.

3. The process according to claim 1, wherein the polymer material is selected from the group consisting of polylactic acid (PLA), polycaprolactone (PCL), polyglycolic acid (PGA), polystyrene (PS), polyethylene (PE), polypropylene (PP), polycarbonate (PC), poly(methyl methacrylate) (PMMA), poly(1,4-phenylene sulfide) (PPS), poly(2,6-dimethyl-1,4-phenylene oxide) (PPO), polyamide (PA), polybutylene terephthalate (PBT), polyetheretherketone (PEEK), polyetherketone (PEK), polyethylene terephthalate (PET), polyimide (PI), polyoxymethylene (POM), polysulfone (PSU), polyurethane (PU), polybutadiene (PB), polytetrafluoroethyelen (PTFE), polyvinylfluoride (PVF), polyvinylidene fluoride (PVDF), polychlorotrifluoroethylene (PCTFE), perfluoroalkoxy polymer (PFA), fluorinated ethylene-propylene (FEP), polyethylenetetrafluoroethylene (ETFE), polyethylenechlorotrifluoroethylene (ECTFE), polyethylene glycol (PEG), polyhydroxyalkanoates (PHA), polyhydroxyvalerate (PHV), polyhydroxybutyrate (PHB), liquid crystal polymer, polyacrylate, polyacetals, polyamideimide (PAI), polybutylene(PB), polyvinylchloride (PVC), acrylonitrile butadiene styrene (ABS), polyphenylsulfone (PPSU), polymethylpentane (PMP), alginate, chitin, chitosan, acrylic acid, hyaluronic acid, starch, amylose, amylopectin, pectin, dextran, pullulan, gum arabic, xanthan gum, pullulan, cellulose, polysaccharides, proteins, nucleic acids, rubber, silicone and co-polymers thereof.

4. The process according to claim 1, comprising at least one metallic material.

5. The process according to claim 1, wherein the metallic material is selected from the group consisting of copper, zinc, aluminium, iron, silver, gold, palladium, platinum, tin, antimony, bismuth, lead, nickel, cobalt, vanadium, manganese, chromium, titanium, tantalum, tungsten, neodymium, lithium, sodium, osmium, iridium, uranium, thorium, plutonium, yttrium, zirconium, niobium, molybdenum, rhodium, cadmium, hafnium, rhenium, mercury, gallium, indium, thallium, lanthanum, cerium, praseodymium, promethium, samarium, europium, gadolinium, terbium, dysprosium, holmium, erbium, thulium, ytterbium, lutetium, potassium, calcium, magnesium, strontium, barium, germanium, arsenic, astatine and alloys and hydrides thereof.

6. The process according to claim 1, wherein the suspension comprises:
   60-90% by weight of the total suspension (w/w) of at least one polymeric material and/or metallic material; and
   at least 10% by weight of the total suspension (w/w) of one or more fatty acids.

7. The process according to claim 1, wherein the suspension further comprises one or more hydrophilic polymer components.

8. The process according to claim 1, comprising in the range 60-95% of the at least one metallic material, by weight of the total suspension (w/w).

9. The process according to claim 1, wherein the one or more fatty acids are selected from the group consisting of caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, and docosahexaenoic acid.

10. The process according to claim 1, wherein the suspension comprises in the range 5-50% fatty acid by weight of the total suspension.

11. The process according to claim 1, wherein the polymer and/or metal material is biodegradable.

12. The process according to claim 1, wherein the polymer and/or metal material is biocompatible.

13. The process according to claim 1, wherein one or more drugs are added before or after 3D printing.

14. The process according to claim 1, wherein the object is a medical implant.

15. The process according to claim 1, wherein the suspension comprises a mixture of 70-92% (w/w) metal material and 8-30% (w/w) fatty acid.

16. The process according to claim 1, wherein the suspension does not comprise a component selected from the group consisting of paraffin, alkanes, waxes, mineral oils, petroleum jelly, polypropylene, polyethylene and polymers that undergo no or limited degradation and/or resorption in the human body.

17. The process according to claim 1, wherein the 3D printing process is selected from the group consisting of robocasting, direct ink writing, ink jet printing, binder jetting, selective heat sintering, selective laser sintering, selective laser melting, stereolithography, filament printing, pellet printing, powder printing, freeform fabrication, rapid prototyping or deposition from a robotic arm.

18. The process according to claim 1, comprising a step c) of solidifying the printed material by a method selected from the group consisting of sintering, hydrating, coating, melting, infiltrating and/or crosslinking the 3D printed material.

19. The process according to claim 1, wherein the particle size of the one or more materials are in the range 1 nm to 1 mm.

20. The process according to claim 1, wherein the suspension comprises less than 1% by weight water.

* * * * *